United States Patent
Iwama et al.

(10) Patent No.: US 9,208,590 B2
(45) Date of Patent: Dec. 8, 2015

(54) MANIPULATION OF AN OBJECT AS AN IMAGE OF A MAPPING OF GRAPH DATA

(75) Inventors: Futoshi Iwama, Kanagawa (JP); Hisashi Miyashita, Kanagawa (JP); Hideki Tai, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 13/524,529

(22) Filed: Jun. 15, 2012

(65) Prior Publication Data

US 2012/0293542 A1  Nov. 22, 2012

Related U.S. Application Data

(63) Continuation of application No. 13/470,898, filed on May 14, 2012, now abandoned.

(30) Foreign Application Priority Data

May 20, 2011  (JP) ................................. 2011-113456

(51) Int. Cl.
- G06F 7/00 (2006.01)
- G06F 17/30 (2006.01)
- G06T 11/20 (2006.01)

(52) U.S. Cl.
CPC ........ *G06T 11/206* (2013.01); *G06F 17/30958* (2013.01); *G06F 17/30961* (2013.01)

(58) Field of Classification Search
None
See application file for complete search history.

(56) References Cited

U.S. PATENT DOCUMENTS

| | | | |
|---|---|---|---|
| 2005/0010606 A1* | 1/2005 | Kaiser et al. | 707/200 |
| 2010/0268722 A1* | 10/2010 | Yalamanchi et al. | 707/759 |
| 2011/0264666 A1* | 10/2011 | Gieseke | 707/741 |
| 2012/0197944 A1* | 8/2012 | Foti | 707/798 |

FOREIGN PATENT DOCUMENTS

| | | |
|---|---|---|
| JP | 05158676 | 6/1993 |
| JP | 05233298 | 9/1993 |
| JP | 09016389 | 1/1997 |
| JP | 10154976 A | 6/1998 |
| JP | 10161990 A | 6/1998 |
| JP | 2001142937 A | 5/2001 |
| JP | 2003030227 A | 1/2003 |
| JP | 2005100402 A | 4/2005 |
| JP | 2006185211 A | 7/2006 |
| JP | 2007026210 A | 2/2007 |
| JP | 2008158759 A | 7/2008 |
| JP | 2008203964 A | 9/2008 |
| JP | 2010033500 A | 2/2010 |
| JP | 2010256978 A | 11/2010 |

* cited by examiner

*Primary Examiner* — Augustine K Obisesan
*Assistant Examiner* — David T Brooks
(74) *Attorney, Agent, or Firm* — Jennifer R. Davis; Ryan, Mason & Lewis, LLP

(57) ABSTRACT

Techniques are disclosed for effectively reflecting a manipulation of an object in graph data. In one example, a method enables a manipulation performed on an object as an image of a mapping of at least a part of graph data including nodes and edges to be reflected in the graph data. The method includes the step of specifying, from among nodes in the graph data that are related to the object being modified by the manipulation, a shared node that may be related to another object as well, and the step of reflecting the manipulation in the graph data while preventing the shared node from being modified.

20 Claims, 22 Drawing Sheets

SPARQL QUERY
FOR KERNEL PATTERN α      ⌐1405

SELECT $A #N1 ?S1
    WHERE {
        OPTIONAL {
            $A <p:name> #N1 .
            $A <p:app> ?S1 .
            ?S1 <p:id> "S007" .
        }
    }

SPARQL QUERY
FOR KERNEL PATTERN β      ⌐1410

SELECT $B #N2 #J ?S2
    WHERE {
        OPTIONAL {
            $B <p:name> #N2 .
            $B <p:budget> #J .
            $B <p:app> ?S2 .
            ?S2 <p:id> "S007" .
        }
    }

SPARQL QUERY
FOR KERNEL PATTERN γ      ⌐1415

SELECT $C #X ?S3
    WHERE {
        OPTIONAL {
            $C <p:x> #X .
            $C <p:app> ?S3 .
            ?S3 <p:id> "S007" .
        }
    }

SPARQL QUERY
FOR KERNEL PATTERN δ      ⌐1420

SELECT $D #Y
    WHERE {
        OPTIONAL {
            $D <p:y> #Y .
        }
    }

SPARQL QUERY
FOR INTERLINK members      ⌐1425

SELECT $A $B
    WHERE {
        OPTIONAL {
            $B <member> $A .
        }
    }

DBTs GENERATED BY QUERYING FOR KERNEL PATTERN α

TA1 1505
| $A | u1 |
|---|---|
| #N1 | "ZZZ" |
| ?S1 | s1 |

TA2 1510
| $A | b1 |
|---|---|
| #N1 | "Finance" |
| ?S1 | s1 |

TA3 1515
| $A | a3 |
|---|---|
| #N1 | n1 |
| ?S1 | s1 |

TA4 1520
| $A | a2 |
|---|---|
| #N1 | n1 |
| ?S1 | s1 |

TA5 1525
| $A | a1 |
|---|---|
| #N1 | "Suzuki" |
| ?S1 | s1 |

DBTs GENERATED BY QUERYING FOR KERNEL PATTERN β

TB1 1530
| $B | b1 |
|---|---|
| #N2 | "Finance" |
| #J | 100 |
| ?S2 | s1 |

DBTs GENERATED BY QUERYING FOR KERNEL PATTERN γ

TC1 1535
| $C | u1 |
|---|---|
| #X | "abc" |
| ?S3 | s1 |

DBTs GENERATED BY QUERYING FOR KERNEL PATTERN δ

(NONE)

DBTs GENERATED BY QUERYING FOR INTERLINK members

Tintr1 1540
| $A | b1 |
|---|---|
| $B | u1 |

Tintr2 1545
| $A | a1 |
|---|---|
| $B | b1 |

CLASS ASSIGNMENT TABLE
FOR REPRESENTATIVE NODES                    1600

| NODE | KERNEL PATTERN MATCHED | | | OBJECT DEFINITION TO BE ASSIGNED |
|---|---|---|---|---|
| a1 | α | | → | Member |
| a2 | α | | → | Member |
| a3 | α | | → | Member |
| b1 | α | β | → | Group |
| u1 | α | γ | → | (N/A) |

TA5  1525

| $A | a1 |
|---|---|
| #N1 | "Suzuki" |
| ?S1 | s1 |

1500

TB1  1530

| $B | b1 |
|---|---|
| #N2 | "Finance" |
| #J | 100 |
| ?S2 | S1 |
| members | a1 | ~1705

1805 a1: Member
-name = Suzuki 1815
members b1 : Group
-name : Finance
-budget : 100

1810    1800

2005 — (101, CREATE, "Member")
2010 — (102, SET, 101, {(name, "Yamada")})
2015 — (103, ADD, <b1>, {members, 101})

MANIPULATION OF AN OBJECT AS AN IMAGE OF A MAPPING OF GRAPH DATA

CROSS-REFERENCE TO RELATED APPLICATION

This application is a Continuation of U.S. patent application Ser. No. 13/470,898, filed on May 14, 2012, the disclosure of which is fully incorporated herein by reference.

FIELD

The field generally relates to information processing techniques.

BACKGROUND

Data of a graph structure with nodes and edges representing connection relationships between the nodes (hereinafter, which may be simply referred to as "graph data") is often used to express a real world model on a computer. Graph data is generally described in accordance with a standardized format such as the resource description framework (RDF), and stored in a database termed a "graph repository". A part or whole of the graph data stored in a graph repository is called by various kinds of application programs for use. Companies in the industry have conducted research and development on software for handling such graph data.

SUMMARY

Embodiments of the invention provide techniques for effectively reflecting a manipulation of an object in graph data.

For example, in one embodiment, a method for causing a manipulation performed on an object as an image of a mapping of at least a part of graph data including nodes and edges to be reflected in the graph data comprises the steps of: specifying, from among nodes in the graph data that are related to the object being modified by the manipulation, a shared node that may be related to another object as well; and reflecting the manipulation in the graph data while preventing the shared node from being modified.

In another embodiment, the method further includes the step of providing a graph matching pattern corresponding to the object. Still preferably, the method further comprises the steps of: specifying a graph matching pattern corresponding to the modified object; and generating a query for specifying a shared node on the basis of the specified graph matching pattern.

In yet another embodiment, the step of reflecting the manipulation comprises a step of reflecting the manipulation in the graph data by using a table that includes an entry of correspondence between a node variable included in the graph matching pattern and a node in the graph data that matches the node variable.

In a further embodiment, the manipulation is generation of an object, and the step of reflecting the manipulation comprises a step of reflecting the manipulation in the graph data by forming a link to the specified shared node without generating a new node. Preferably, the manipulation is generation of an object, and the method further comprises the step of newly creating the table corresponding to the generated object. The method further comprises the step of adding to the table an entry corresponding to the specified shared node, and/or the step of adding to the newly created table an entry corresponding to a representative node variable included in the graph matching pattern. Further, an entry corresponding to a node other than a representative node variable and a shared node variable included in the graph matching pattern may be added to the created table, and the manipulation may be reflected in the graph data on the condition that entries included in the table are all filled.

In a still further embodiment, the manipulation is updating of an object, and the method further comprises the steps of: specifying the table corresponding to the modified object; and reflecting the object updating performed on the object in the specified table.

In yet a further embodiment, the manipulation is deletion of an object, and the step of reflecting the manipulation comprises a step of reflecting the manipulation in the graph data while preventing the specified shared node from being deleted. The manipulation may be deletion of an object, and the method may further comprise the steps of: specifying the table corresponding to the modified object; and, on the basis of information other than information on the shared node included in the table, reflecting the manipulation in the graph data while preventing the shared node from being deleted.

While embodiments of the present invention have been summarized above as a method for manipulating data, embodiments of the present invention may also be understood as a program, a program product, software, a software product, a system, a device, and so on. The program or software product may comprise, for example, a storage medium which stores the program or software, or a medium which transmits the program or software.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 14 shows kernel pattern graph queries written in SPARQL according to an embodiment of the present invention.

FIG. 15 shows results of queries using the kernel pattern graph queries written in SPARQL according to an embodiment of the present invention.

FIG. 20 shows manipulation logs for the first example of the flow of the object manipulation according to an embodiment of the present invention.

DETAILED DESCRIPTION

Figure 1:
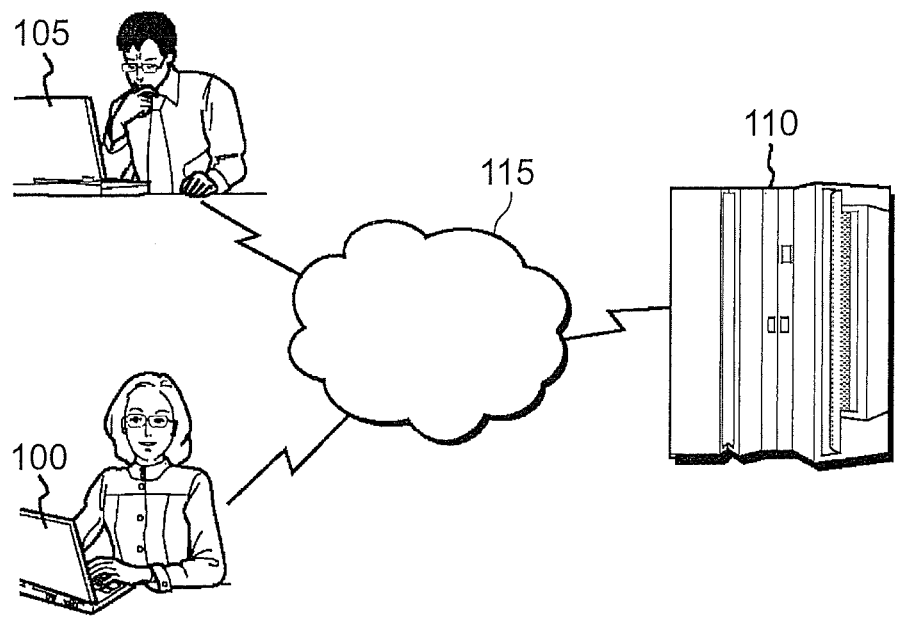
FIG. 1 is a diagram illustrating, by way of example, an overview of a data processing system according to an embodiment of the present invention.

While a mode for carrying out embodiments of the present invention will now be described in detail with reference to the drawings, the following embodiments are not to restrict the invention recited in the claims for patent. Further, all the combinations of the features discussed in the embodiments are not necessarily indispensable for the solving means of the invention.

Furthermore, embodiments of the present invention can be implemented in many different manners, and should not be understood only from the content described in the embodiment. Throughout the description of the embodiment, the same elements are denoted by the same reference characters.

When graph data stored in a graph repository is to be used in an application, the graph data may be too complicated or include unnecessary details for that application. Therefore, there is a demand, not to directly access the entire graph data, but to use a part or whole of the graph data via an object, in the form of an image of a mapping of the graph data, that meets the purposes of a particular application. In this case, it is preferable that the manipulations performed on the object meeting the purposes of the application are effectively reflected in the original graph data.

In the case where a whole object that meets the purposes of an application is an image of a homomorphism of graph data, a one-to-one correspondence can be established between a manipulation of the former and a manipulation of the latter. There is, however, a case where a part of the object is not a homomorphism of the graph data. In such a case, attention should be paid to the way of causing a manipulation of the object to be reflected in the graph data.

For example, assume that graph data includes a node that may be related to two or more objects. In this case, if an adding, deleting, or other manipulation is performed on one of the objects related to the node, the adding, deleting, or other manipulation may also be performed on that node in the graph data. This may adversely affect the other object(s) related to that node.

FIG. 1 is a diagram illustrating, by way of example, an overview of a data processing system according to an embodiment of the present invention. The data processing system includes a first terminal 100 operated by a first user, a second terminal 105 operated by a second user, and a server 110 provided with a graph repository for storing graph data. The terminals 100 and 105 and the server 110 are connected to each other via a network 115, so that they can communicate information in the form of electronic data with each other. The network 115 is typically the Internet or an intranet.

In the embodiment of the present invention, the terminals 100 and 105 operated by the users each have object handling software installed therein. Each of the terminals 100 and 105 of the embodiment of the present invention includes input/output devices which are operated by a user and provide the user with information. The input/output devices include a keyboard and a mouse as the input devices, and a display device as the output device.

In the embodiment of the present invention, a user uses a keyboard, a mouse, or other input devices to operate an application program with a window-based graphical user interface that visually presents information about the progress of work and others on the display device of the terminal 100 or 105.

Each user can request from the server 110, via the network 115, graph data to be manipulated using an application program running on the terminal 100 or 105 operated by the user. The server 110 then returns, as the requested graph data, a subset (a part) of the graph data stored in the graph repository, via the network 115. It is assumed in the embodiment of the present invention that the terminals have application programs introduced therein, the programs being common in that they manipulate the graph data stored in the graph repository but different in their purposes.

In the embodiment of the present invention, with regard to the graph data received from the graph repository, a distinction is made between: a portion that can be converted to a data structure as an image of a homomorphism, and a portion other than that portion. In the embodiment of the present invention, regarding the former portion, each terminal converts at least a part of the graph data received from the graph repository to an image of a homomorphism thereof, to thereby generate object data. Here, "homomorphic" is a concept that expresses the similarity between structures. When one structure is an image of a homomorphism of another structure, a one-to-one correspondence can be established between a manipulation of the former and a manipulation of the latter. For this characteristic, a homomorphism is often expressed as "structure-preserving", "compatible with the structure", and so on.

For converting graph data to object data, a subset of the graph data that matches a kind of graph matching pattern (hereinafter, which may be referred to as a "kernel pattern") defined by a user in advance is instantiated in accordance with an object class definition (hereinafter, which may be simply referred to as an "object definition") defined by the user in advance, to thereby generate object data suitable for the purposes of an application program used by the user.

Then, in the embodiment of the present invention, the user manipulates the object data in the application program installed in the terminal. In the embodiment of the present invention, the manipulation performed on the object data is reflected in the original graph data stored in the graph repository of the server 110, by taking advantage of the above-described homomorphic characteristic of the object data. The embodiment of the present invention ensures that a manipulation performed on an object is reflected in graph data properly so that the object which has been manipulated is identical to an object which is obtained by mapping from the graph data that has reflected the manipulation.

Figure 2:
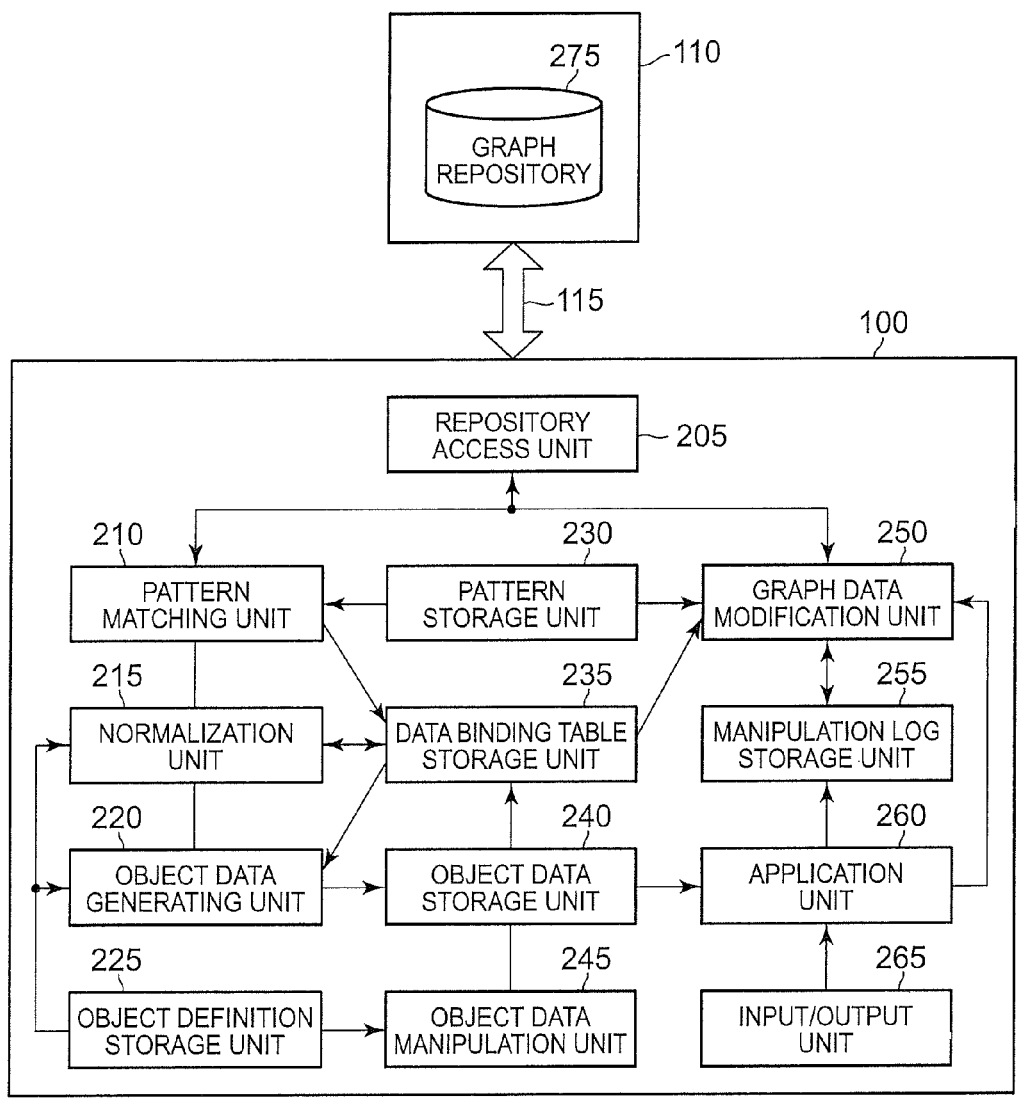
FIG. 2 is a functional block diagram of the data processing system according to an embodiment of the present invention.

FIG. 2 is a functional block diagram of the data processing system including the user terminal 100 and the server 110 according to an embodiment of the present invention. The elements illustrated in the functional block diagram in FIG. 2 can be implemented in an information processing device having the hardware configuration illustrated, for example, in FIG. 27. To this end, computer programs including an operating system and object handling software, stored in a hard disk drive 13 and so on, are loaded to a main memory 4 to cause a CPU 1 to read the programs, thereby causing hardware resources and software to cooperate together.

The server 110 of the embodiment of the present invention includes a graph repository 275. The graph repository 275 of the embodiment of the present invention has the function of storing graph data. The graph data of the embodiment of the present invention includes nodes and directed or non-directed edges that represent connection relationships between the nodes, and an attribute value can be set for each of the nodes and edges. It is assumed in the embodiment of the present invention that the graph data is described in accordance with the resource description framework (RDF) format standardized as World Wide Web Consortium (W3C) recommendation.

The graph repository 275 also has the function of receiving, from a repository access unit 205 in the user terminal 100, a query written in SPARQL Protocol and RDF Query Language (SPARQL) standardized as W3C recommendation, and returning, to the repository access unit 205, a whole or part of the graph data that matches the conditions described in the query. An example of the returned graph data will be described later in detail with reference to FIG. 13 etc. The graph repository 275 for storing such graph data may be implemented as appropriate by those skilled in the art who read this specification, and therefore, no further detailed description thereof will be provided here.

The terminal 100 according to an embodiment of the present invention includes: the repository access unit 205, a pattern matching unit 210, a normalization unit 215, an object data generating unit 220, an object definition storage unit 225, a kernel pattern storage unit 230, a data binding table (DBT) storage unit 235, an object data storage unit 240, an object data manipulation unit 245, a graph data modification unit 250, a manipulation log storage unit 255, an application unit 260, and an input/output unit 265.

The repository access unit 205 of the embodiment of the present invention has the function of generating a query for querying the graph data stored in the graph repository 275 in the server 110, in accordance with an instruction that is issued by the application unit 260 and received via the graph data modification unit 250, which will be described later. The repository access unit 205 is able to transmit the generated query to the graph repository 275 via the network 115, and receive therefrom the graph data found as a result of the query.

It is assumed in the embodiment of the present invention that the repository access unit 205 has the function of accessing the graph data stored in the graph repository so as to at least query and modify the graph data. In the embodiment of the present invention, the query for accessing the graph repository is implemented as one written in SPARQL, although it is of course possible to adopt another arbitrary graph data query language. The repository access unit 205 of the embodiment of the present invention passes the graph data obtained from the graph repository 275 as a result of querying the graph data, to the pattern matching unit 210.

The pattern matching unit 210 of the embodiment of the present invention performs matching between the graph data passed from the repository access unit 205 and the kernel pattern stored in the kernel pattern storage unit 230. Examples of the kernel patterns will be described later in detail with reference to FIG. 11. For matching, a query that is written in SPARQL, prepared for each kernel pattern or generated on the basis of the kernel pattern, is run against the target graph data. Examples of the queries corresponding to the kernel patterns will be described later in detail with reference to FIG. 14. Further, the pattern matching unit 210 uses the results of the queries for the respective kernel patterns to create initial data binding tables (DBTs), and stores them in the data binding table (DBT) storage unit 235. Examples of the initial DBTs will be described later in detail with reference to FIG. 15.

Figure 5:
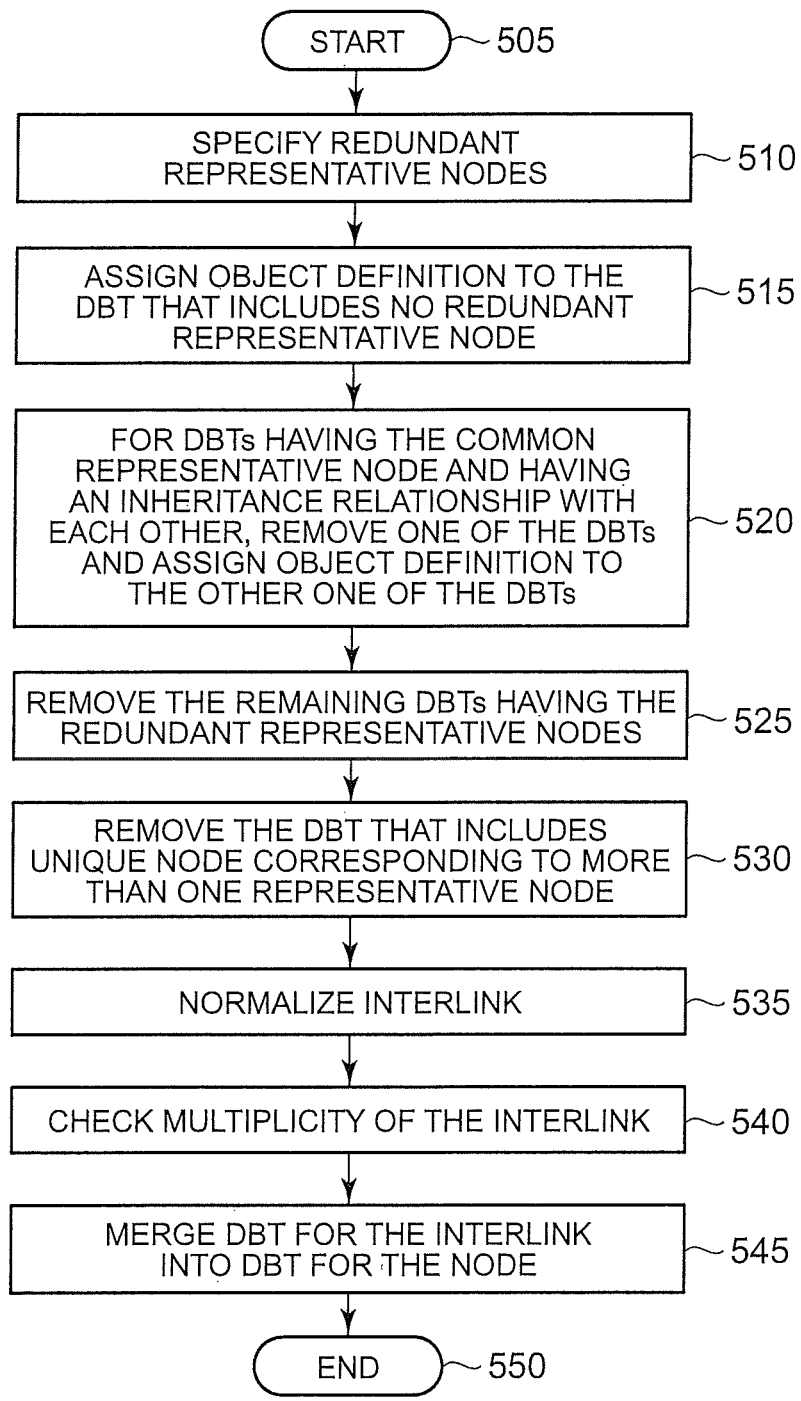
FIG. 5 is a flowchart illustrating, by way of example, an operation of normalization processing according to an embodiment of the present invention.

The normalization unit 215 of the embodiment of the present invention processes the initial DBTs, which have been generated by the pattern matching unit 210 and stored in the DBT storage unit 235, such that the object data that is generated later by referring to the DBTs becomes an image of a homomorphism of the graph data. Herein, the processing performed on the DBTs is called "normalization", which will be described later in detail with reference to FIG. 5.

The object data generating unit 220 of the embodiment of the present invention refers to DBTs stored in the DBT storage unit 235 and object definitions stored in the object definition storage unit 225, to convert the graph data obtained by the repository access unit 205 to object data. The graph data is converted to a format suitable for the purposes of the application program used by a user, and the generated object data is stored in the object data storage unit 240.

The object definition storage unit 225 of the embodiment of the present invention stores object class definitions (i.e. object definitions) defined by a user. The object definitions are referred to by the object data generating unit 220 for conversion of the graph data to the object data. Examples of the object definitions will be described later in detail with reference to FIG. 12.

The pattern storage unit 230 of the embodiment of the present invention stores kernel patterns for use in matching by the pattern matching unit 210. The data binding table (DBT) storage unit 235 stores DBTs generated by the pattern matching unit 210. As described previously, the DBTs stored in the DBT storage unit 235 are processed by the normalization unit 215, and referred to by the object data generating unit 220.

The object data storage unit 240 of the embodiment of the present invention stores object data that the object data generating unit 220 generates by converting the graph data. The object data stored in the object data storage unit 240 have been generated by instantiating the object definitions defined by users, and thus, each piece of object data has the data structure suitable for the purposes of the application program operated by the corresponding user. The object data stored in the object data storage unit 240 may be manipulated directly by the application unit 260 or via the object data manipulation unit 245.

The graph data modification unit 250 of the embodiment of the present invention instructs the repository access unit 205 to query or modify the graph data stored in the graph repository 275, on the basis of the user's operation of the application program in the application unit 260, or on the basis of the manipulation log of the application program in the application unit 260 that is stored in the manipulation log storage unit 255.

The manipulation log storage unit 255 of the embodiment of the present invention stores a manipulation log of the application in the application unit 260. The application unit 260 runs the application operated by the user. The input/output unit 265 passes an operation received from a user to the application unit 260, and also provides a user with, for example, a display of the object data received from the application unit 260.

Figure 3:
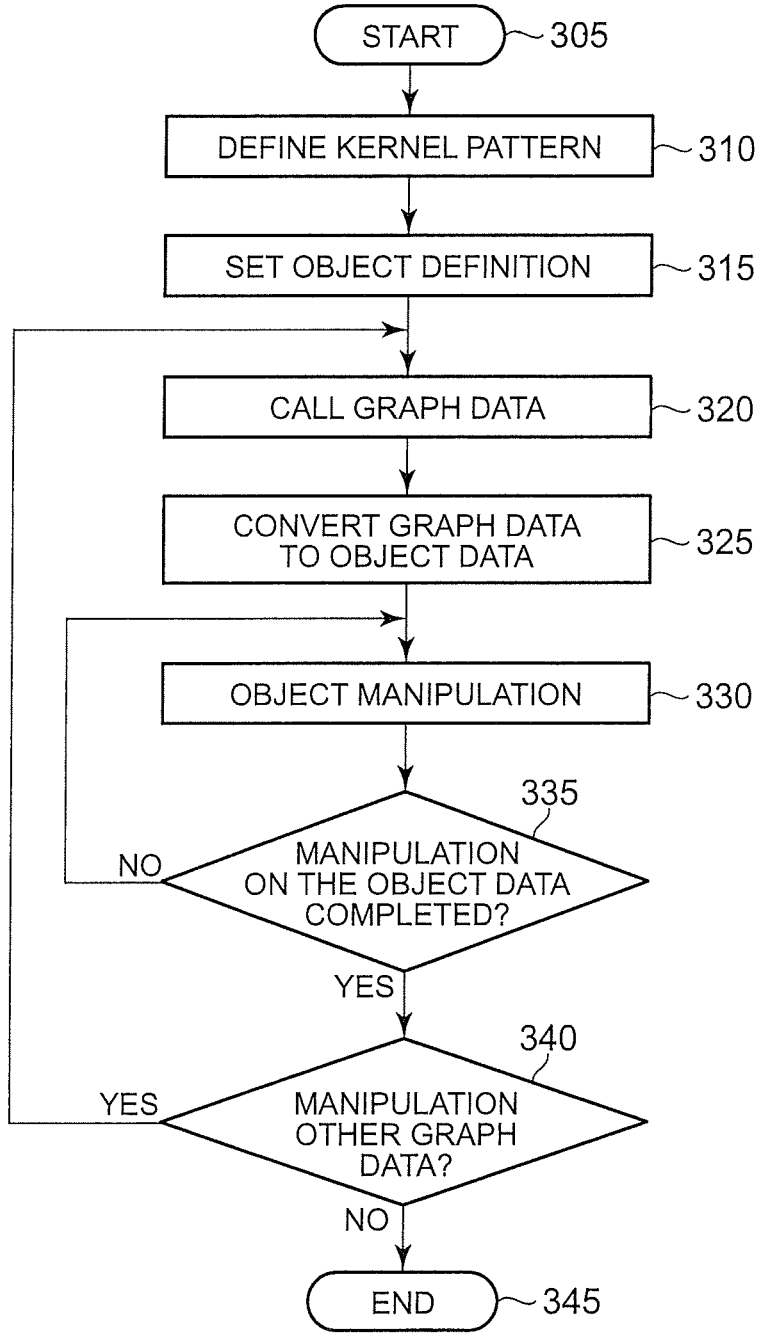
FIG. 3 is a flowchart illustrating an operation of the data processing system according to an embodiment of the present invention.

FIG. 3 is a flowchart 300 illustrating an operation of the data processing system according to an embodiment of the present invention. The process starts at step 305. In step 310, a kernel pattern is defined by a user. The kernel pattern is a kind of graph matching pattern that is referred to in matching with graph data. It is assumed in the embodiment of the present invention that the definition of the kernel pattern is given by a user by interactively operating an application program having the kernel pattern defining function, or is prepared by the user in advance.

Figure 11:
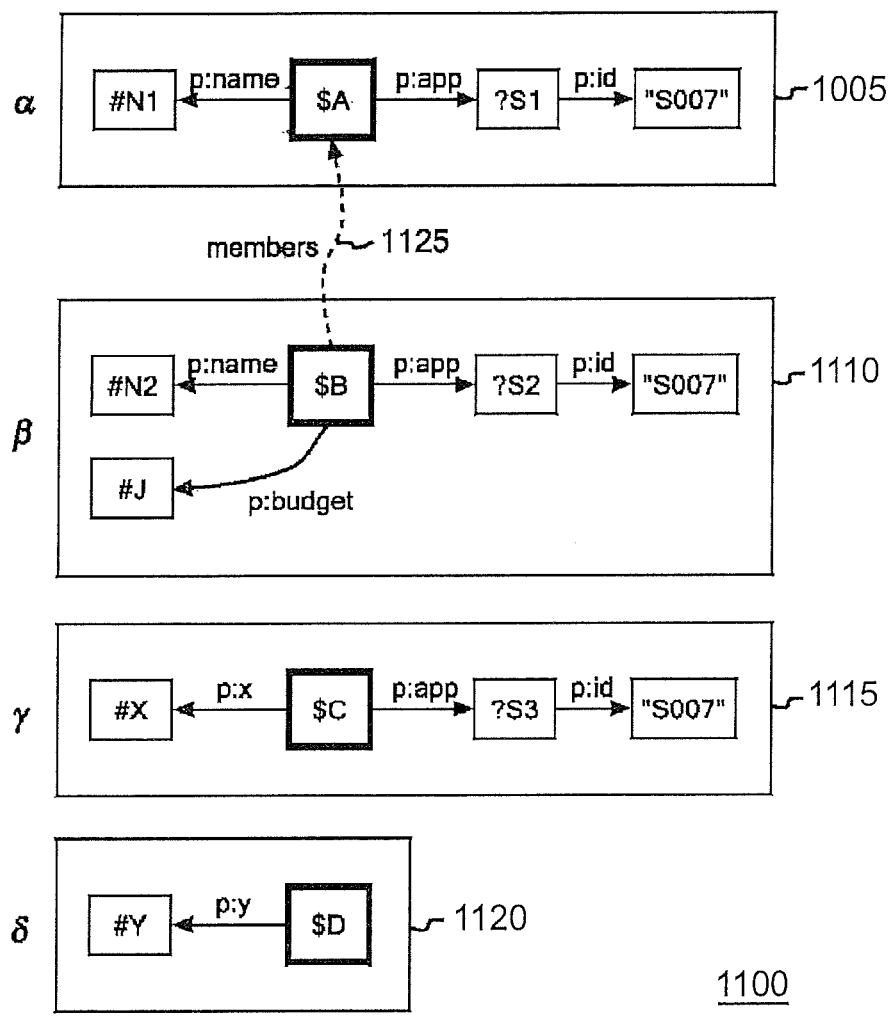
FIG. 11 shows, by way of example, a data set of kernel patterns according to an embodiment of the present invention.

FIG. 11 shows, by way of example, a data set of kernel patterns in an embodiment of the present invention. In this example, four kernel patterns 1105, 1110, 1115, and 1120 have been defined. In the embodiment of the present invention, these kernel patterns are identified with labels α, β, γ, and δ respectively attached thereto. Each kernel pattern includes a plurality of nodes and an edge connecting the nodes to each other. The edges used in the embodiment of the present invention are directed edges. There may be an edge between nodes belonging to different kernel patterns. Such an edge between the elements belonging to the different kernel patterns is herein called an "interlink". For example, in the example shown in FIG. 11, an interlink 1125 connects an element "$A" in the kernel pattern α with an element "$B" in the kernel pattern β. An attribute value can be set for each of the nodes and the edges.

In a kernel pattern, some of node variables have a constraint condition described therein. The constraint condition is used for removing a part of the kernel pattern matching results (more specifically, initial DBTs), which will be described later in detail. In the embodiment of the present invention, there are two constraint conditions as follows.

The first constraint condition is set to only one kind of node variable in each kernel pattern. The node variable in a kernel pattern to which the first constraint condition has been set may be called a "representative node variable", and the node matching the representative node variable may be called a "representative node". The first constraint condition is that "there is at most one node in graph data that matches the representative node variable and this node is prohibited from matching a node variable in another kernel pattern (except for the case where the kernel pattern has an inheritance relationship with the other kernel pattern)". Further, in the embodiment of the present invention, the node matching the representative node variable may become an endpoint of an interlink with a node belonging to another kernel pattern. In the embodiment of the present invention, a node variable in a kernel pattern is set as a representative node variable by attaching a prefix "$" to the name of that node variable.

The second constraint condition may be set to an arbitrary node variable in a kernel pattern, although a kernel pattern does not necessarily have to include a node to which the second constraint condition is set. The node variable in a kernel pattern to which the second constraint condition has been set may be called a "unique node variable". The second constraint condition is that "the node in the graph data that matches the unique node variable to which the second constraint condition has been set has to 'uniquely correspond' to the node in the graph data that matches the representative node variable in the kernel pattern". In the embodiment of the present invention, the node matching the unique node variable may become an endpoint of an interlink with a node belonging to another kernel pattern. In the embodiment of the present invention, a node variable in a kernel pattern is set as a unique node variable by attaching a prefix "#" to the name of that node variable.

The nodes in graph data that match the above-described representative node variable and unique node variable belong to the portion in the graph data that can be converted to a data structure as an image of the homomorphism. The first and second constraint conditions described above are used to enable the conversion of the graph data to the data structure as an image of the homomorphism.

Further, in the embodiment of the present invention, a kernel pattern may include, besides the representative node variable and unique node variable, a direct-designated node which is a node in graph data directly designated by its identifier such as a URL, a literal node to which a "value" itself is set, and a general node variable which is a node variable that matches a node without constraints. The direct-designated node may be set by directly designating the identifier of the node in the graph data as the name of the node. The literal node may be set by double-quoting the name of the node for use as a "value". The general node variable may be set by attaching a prefix "?" in front of the name of the node variable. In the embodiment of the present invention, a literal node is to be connected to a single node via an edge.

In this manner, in the embodiment of the present invention, regarding the graph data received from the graph repository, a distinction is made between: a portion that can be converted to a data structure as an image of the homomorphism, and a portion other than that portion.

Next, the process proceeds to step 315, where an object definition is set by a user operating a terminal. In the embodiment of the present invention, the object definition is set by a user who interactively operates an application program having the object defining function, or is prepared by the user in advance. In the embodiment of the present invention, the object definition defines a class that is to be referred to when converting a subset of the graph data that matches a kernel pattern to object data. More specifically, the object definition expresses a structure of an object, and a subset of the graph data matching the kernel pattern is converted into the object data by instantiating the corresponding object definition.

Figure 12:
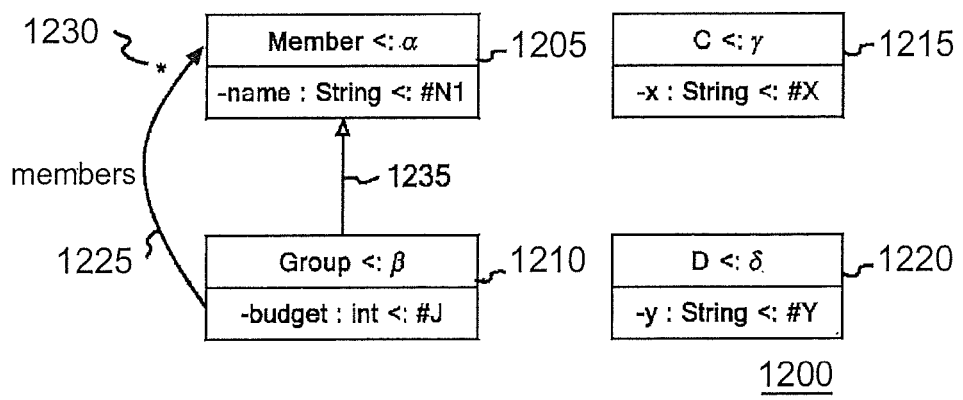
FIG. 12 shows, by way of example, a data set of object definitions according to an embodiment of the present invention.

FIG. 12 shows, by way of example, a set of object definitions in an embodiment of the present invention. The set of the object definitions includes object definitions 1205, 1210, 1215, and 1220 corresponding to kernel patterns. These object definitions correspond respectively to the kernel patterns 1105, 1110, 1115, and 1120 shown in FIG. 11. In this example, the set also includes an object definition 1225 corresponding to an interlink. This object definition corresponds to the interlink 1125 shown in FIG. 11.

Specifically, the object definition 1205 defines that: the class has a name "Member", it is instantiated when it matches the kernel pattern α, and it has an attribute "name", the value of which is a string of characters (String) that is given to the node matching the node variable "#N1" in the kernel pattern. The object definition 1210 defines that: it has a name "Group", it is instantiated when it matches the kernel pattern β, and it has an attribute "budget", the value of which is an integer (Int) that is given to the node matching the node variable "#J" in the kernel pattern. It is noted that an edge 1235 for showing an inheritance relationship shows that the object definition 1210 defines the class that has inherited from the object definition 1205. There exists a relation 1225 named "members" between the object definitions 1210 and 1205, which relation corresponds to the interlink 1125. A symbol "*" 1230 attached to the relation 1225 is for indicating the multiplicity allowable for the relation (i.e., up to what number of relations can be formed), "*" meaning that there is no limit for the multiplicity.

The object definition 1215 defines that: it has a name "C", it is instantiated when it matches the kernel pattern γ, and it has an attribute "x", the value of which is a string of characters (String) that is given to the node matching the node variable "#X" in the kernel pattern. The object definition 1220 defines that: it has a name "D", it is instantiated when it matches the kernel pattern δ, and it has an attribute "y", the value of which is a string of characters (String) that is given to the node matching the node variable "#Y" in the kernel pattern. The way of using these object definitions for generating object data will be described later in detail.

The process then proceeds to step 320, where the user operates the application program, from the application unit 260 on the data processing system via the graph data modification unit 250 and the repository access unit 205, to query the graph repository 275 for the graph data to be processed. Specifically, a graph data query operation on the application program is detected and interpreted to generate a query written in SPARQL, which is then transmitted to the graph repository 275 for querying the graph data.

Next, in step 325, in order to make the graph data obtained by the repository access unit 205 into a form suitable for the purposes of the application program operated by the user, the kernel pattern stored in the kernel pattern storage unit 230 and the object definition stored in the object definition storage unit 225 are used to convert the graph data to object data. As described previously, the converted and generated object data is stored in the object data storage unit 240. The conversion to the object data will be described later in detail with reference to FIGS. 4 and 5.

The process then proceeds to step 330, where the object data obtained in step 325 and stored in the object data storage unit 240 is manipulated. In the embodiment of the present invention, the manipulation performed on the object data is reflected in the graph data stored in the graph repository 275 by taking advantage of the homomorphic characteristic of the object data. The processing will be described later in detail with reference to FIGS. 6, 7, 8, 9, and 10.

Next, in step 335, it is determined whether the manipulation on the object data as the processing target has been completed. If it is determined in step 335 that the manipulation on the object data as the processing target has not been completed, the process follows the NO arrow to return to step 330, where the manipulation on the object data is continued. If it is determined in step 335 that the manipulation on the object data as the processing target has been completed, the process follows the YES arrow to proceed to step 340.

In step 340, it is determined whether to perform a manipulation on other graph data. If it is determined in step 340 to perform the manipulation on the other graph data, the process follows the YES arrow to return to step 320, where the part corresponding to that other graph data is read out of the graph repository 275, and thereafter, similar processing is repeated. If it is determined in step 340 that no manipulation will be performed on other graph data, the process follows the NO arrow to proceed to step 345, where the process is terminated.

Figure 4:
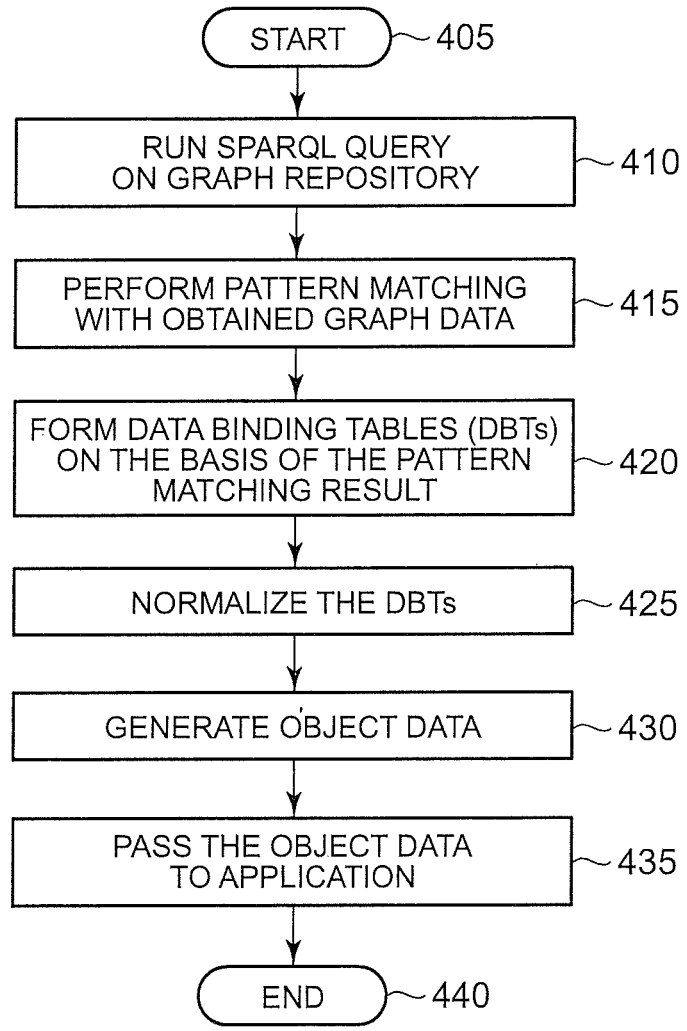
FIG. 4 is a flowchart illustrating an operation of object data generation by the data processing system according to an embodiment of the present invention.
Figure 13:
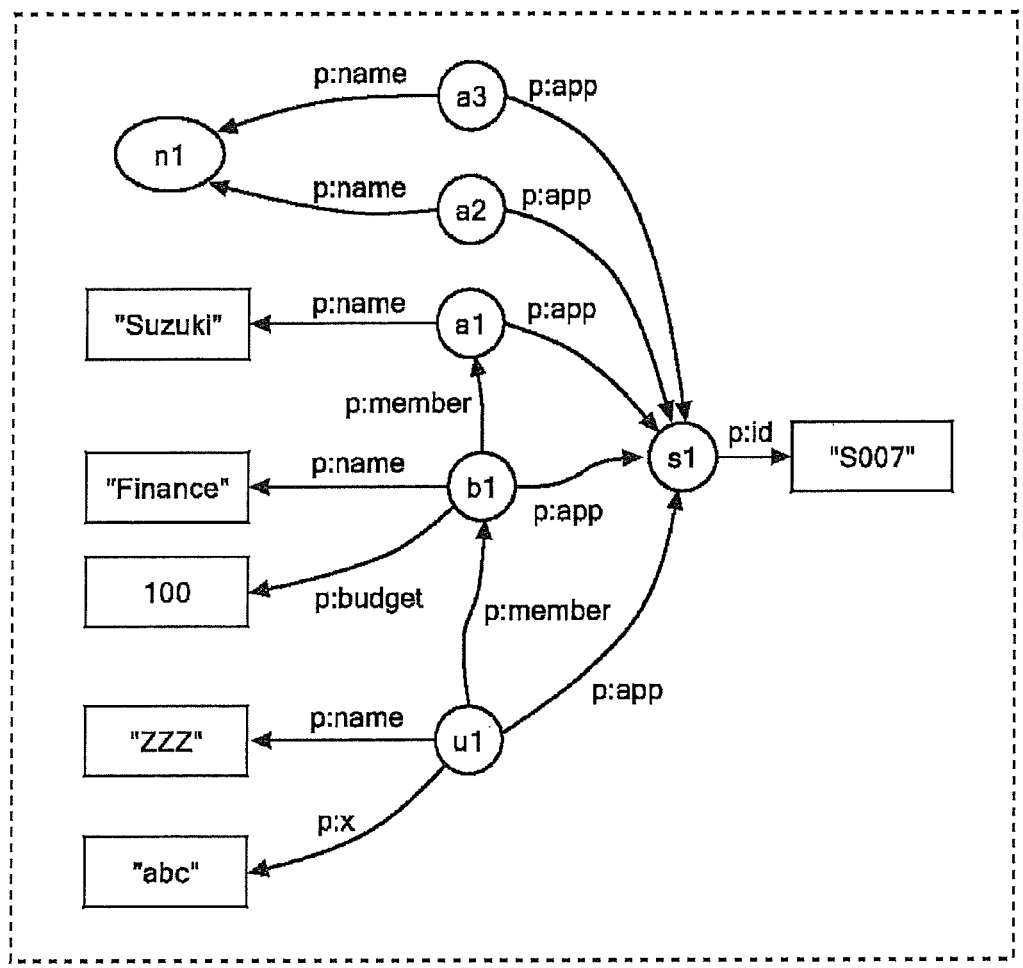
FIG. 13 shows, by way of example, graph data according to an embodiment of the present invention.

An example of the processing of converting graph data to object data, performed in step 325 in FIG. 3, will now be described in more detail with reference to a flowchart 325 in FIG. 4. FIG. 4 shows the flowchart 325 illustrating an object data generating operation by the data processing system according to an embodiment of the present invention. The process starts at step 405. In step 410, a query written in SPARQL is used to query the graph repository 275 for graph data. FIG. 13 shows graph data 1300 that is read out and returned from the graph repository in the embodiment of the present invention. It is assumed in the embodiment of the present invention that the graph data 1300, shown by way of example, is stored in the graph repository, and is read out as the processing target, using a query written in SPARQL, so as to be converted to object data.

The process then proceeds to step 415, where the graph data 1300 obtained in step 410 is subjected to pattern matching with a kernel pattern stored in the kernel pattern storage unit 230. In the embodiment of the present invention, the pattern matching is carried out, on the terminal operated by the user, by running a query written in SPARQL, prepared for each kernel pattern, on the graph data as the processing target.

FIG. 14 shows a set 1400 of graph queries, written in SPARQL, prepared for the respective kernel patterns in an embodiment of the present invention. The graph query set 1400 includes queries 1405, 1410, 1415, 1420, and 1425, which correspond respectively to the kernel patterns 1105, 1110, 1115, 1120, and the interlink 1125, shown in FIG. 11. These queries are each run on the graph data obtained in step 410, so as to obtain information about one or more subsets of the graph data 1300 that match the corresponding kernel pattern.

The process then proceeds to step 420. In step 420, for each of the subsets of the graph data 1300 matching the kernel pattern, obtained in step 415, data in a table structure called a "data binding table (DBT)" is formed as the information about the subset. Each DBT includes an entry indicating correspondence between a node included in the corresponding kernel pattern and the matching node in the graph data.

FIG. 15 shows, by way of example, initial DBTs formed as a result of queries using the graph queries, written in SPARQL, for the respective kernel patterns according to an embodiment of the present invention. In the embodiment of the present invention, five subsets of the graph data succeeded in matching with the kernel pattern α (tables 1505, 1510, 1515, 1520, 1525), one subset succeeded in matching with the kernel pattern β (table 1530), and one subset succeeded in matching with the kernel pattern γ (table 1535). With the kernel pattern δ, no subset of the graph data succeeded in matching, so that no DBT has been formed. With the interlink "members", two edges succeeded in matching (tables 1540, 1545).

The process then proceeds to step 425, where normalization is carried out. An example of the DBT normalization processing in step 425 in FIG. 4 will now be described in more detail with reference to a flowchart 425 in FIG. 5. The process starts at step 505. In step 510, the initial DBTs obtained in step 420 are scanned to specify any node in the graph data that matches the representative node (having the prefix "$" attached thereto in the kernel pattern) in more than one DBT. In the embodiment of the present invention, the node b1 (that matches the representative nodes in the DBTs 1510 and 1530) and the node u1 (that matches the representative nodes in the DBTs 1505 and 1535) are specified.

Next, in step 515, for any DBT including no node specified in step 510, i.e. for any DBT having a node in the graph data that matches the representative node in that DBT and does not match any of the representative nodes in the other DBTs, the corresponding object definition is assigned to the representative node. As a result, the object definition 1205 (name: "Member") is assigned to each of the representative nodes (i.e. a1, a2, and a3) in the DBTs 1515, 1520, and 1525.

The process then proceeds to step 520. In step 520, for the DBTs including the same node specified in step 510, if there is an inheritance relationship between the object definitions corresponding to the respective DBTs, then the DBT corresponding to the object definition on the inherited side is removed, and the object definition is assigned to the representative node in the DBT corresponding to the object definition on the inheriting side. In the embodiment of the present invention, for the DBTs 1510 and 1530, the object definitions 1205 and 1210 corresponding respectively thereto have the inheritance relationship. Therefore, the DBT 1510 which is on the inherited side is removed, while the DBT 1530 which is on the inheriting side is left, and the corresponding object definition 1210 (name: "Group") is assigned to the representative node (i.e. b1).

Next, in step 525, for the DBTs including the same node specified in step 510, if there is no inheritance relationship between the object definitions corresponding to the respective DBTs, then those DBTs are all removed. In the embodiment of the present invention, the DBTs 1505 and 1535 are removed.

Through the above-described steps 510 to 525, removal of DBTs using the first constraint condition and assignment of the object definitions to the representative nodes are carried out. As a result, in the embodiment of the present invention, the DBTs 1505, 1510, and 1535 are removed, while the DBTs 1515, 1520, 1525, 1530, 1540, and 1545 are left in the DBT storage unit 235. It is noted that, in the embodiment of the present invention, the removal of the DBTs and assignment of the object definitions described above are carried out by generating an object definition assignment table 1600 shown in FIG. 16 and processing in accordance therewith.

The process then proceeds to step 530, where removal of DBTs using the second constraint condition in the kernel pattern described above is carried out. In the embodiment of the present invention, as for the unique node "#N1" in the kernel pattern 1105 to which the prefix "#" representing the second constraint condition has been attached, the node "n1" corresponds to "#N1" in both of the DBTs 1515 and 1520. "#N1", which is the unique node, has to uniquely correspond to a node that matches the representative node "$A" in the kernel pattern 1105. Thus, the DBTs 1515 and 1520 are removed. As a result, the DBTs 1525, 1530, 1540, and 1545 are left in the DBT storage unit 235.

Next, in step 535, removal of DBTs corresponding to interlinks is carried out. Specifically, the DBTs remaining in the DBT storage unit 235 as a result of execution of the DBT normalization processing corresponding to the kernel patterns up to then (steps 505 through 530) are referred to, and any DBT corresponding to the interlink the content of which is inconsistent with those of the DBTs left in the DBT storage unit 235 is removed. In the embodiment of the present invention, the DBT 1540 which has the content inconsistent with those of the DBTs 1525 and 1530 is removed. As a result, the DBTs 1525, 1530, and 1545 are left in the DBT storage unit 235.

The process then proceeds to step 540, where it is determined whether the multiplicity of each interlink satisfies the allowable multiplicity described in the object definition. In step 540, the processing in the case where it does not satisfy the allowable multiplicity is performed as well. The processing may be performed for example in the following manner. The user may be alerted and caused to select the interlink to be instantiated, or the process may be terminated at that point. Those skilled in the art will be able to perform the processing as appropriate, and therefore, a detailed description thereof will not be provided here.

Figures 16, 17, 18:
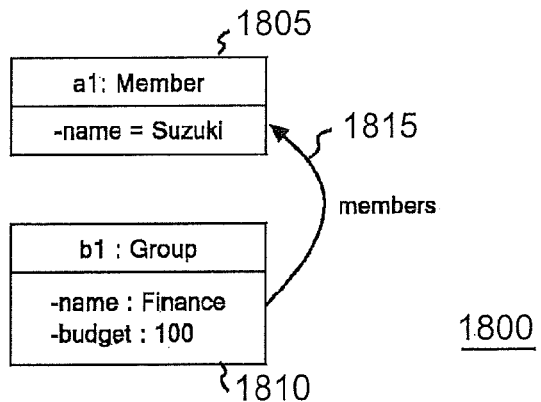
FIG. 16 shows, by way of example, a type (or class) assignment table for representative nodes according to an embodiment of the present invention.
FIG. 17 shows, by way of example, object data according to an embodiment of the present invention.
FIG. 18 shows, by way of example, object data generated from graph data according to an embodiment of the present invention.

Next, in step 545, the content of the DBT corresponding to the interlink is reflected in the DBT corresponding to the object on the referring side of the interlink. More specifically, an entry including correspondence between the name of that interlink and the name of the referred-to node is added to the DBT corresponding to the referring object. In the embodiment of the present invention, the content of the DBT 1545 is added to the DBT 1530. The process then proceeds to step 550, where the process is terminated. The contents of the DBTs that have undergone the normalization processing in the embodiment of the present invention are shown in FIG. 17.

Returning to FIG. 4, in step 430, by referring to the DBTs normalized in step 425 and stored in the DBT storage unit 235 and the object definitions stored in the object definition storage unit 225, the graph data is converted to object data, or, the object definitions are instantiated to generate object data, and the generated object data is stored in the object data storage unit 240. FIG. 18 shows an example of the object data generated in the embodiment of the present invention. The process then proceeds to step 435, where the object data is transmitted to the application program in the application unit 260 and visually presented to the user via the input/output unit 265. The process is then terminated in step 440.

Figure 6:
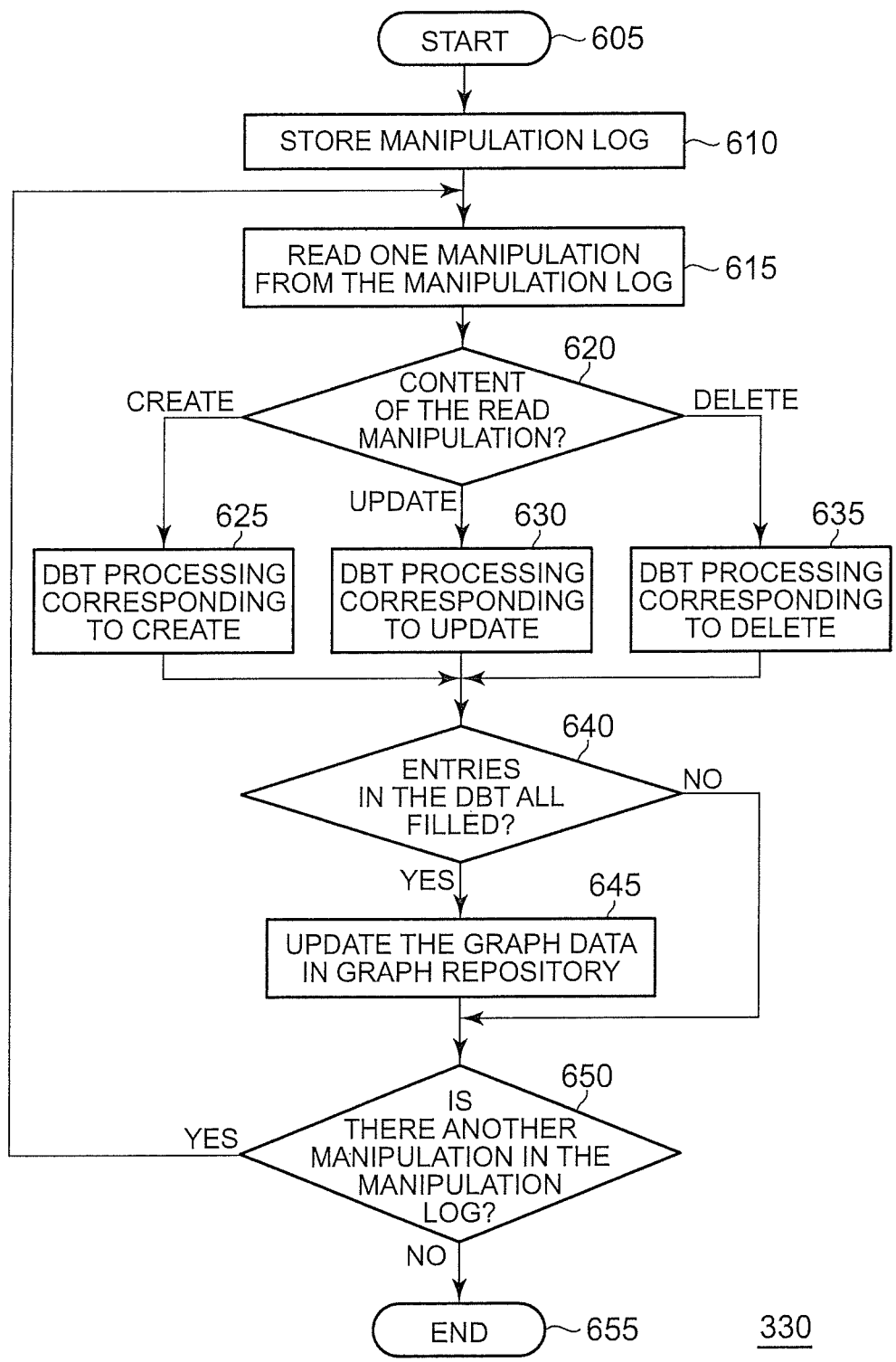
FIG. 6 is a flowchart illustrating an operation of object manipulation by the data processing system according to an embodiment of the present invention.

Next, with reference to a flowchart 330 in FIG. 6, an example of the object data manipulating processing and the accompanying processing of reflecting the result in the graph data stored in the graph repository, performed in step 330 in FIG. 3, will be described in more detail. FIG. 6 shows the flowchart illustrating an operation of object manipulation by the data processing system according to an embodiment of the present invention. The process starts at step 605. In step 610, the manipulation log storage unit 255 receives a log of object data manipulations performed via the application program by the user (herein, this log is simply referred to as the "manipulation log") from the application unit 260, and stores the received log.

The process proceeds to step 615, where one manipulation is read from the manipulation log stored in the manipulation log storage unit 255 in step 610. The process then proceeds to step 620, where it is determined to which one of object generating manipulation (CREATE), object updating manipulation (UPDATE), and object deleting manipulation (DELETE) the read manipulation corresponds. In the embodiment of the present invention, the object generating manipulation (CREATE) includes addition of a new object. The object updating manipulation (UPDATE) includes a change of the attribute value of the existing object, and addition or deletion of the relation between the objects. The object deleting manipulation (DELETE) includes deletion of the existing object.

If it is determined in step 620 that the manipulation read in step 615 is the object generating manipulation (CREATE), the process follows the arrow labeled "CREATE" to proceed to step 625, where DBT processing corresponding to the CREATE manipulation is performed on the DBT corresponding to the object that is a target of the manipulation read in step 615. The process then proceeds to step 640. The DBT processing corresponding to the CREATE manipulation will be described later in detail with reference to a flowchart in FIG. 7.

If it is determined in step 620 that the manipulation read in step 615 is the object updating manipulation (UPDATE), the process follows the arrow labeled "UPDATE" to proceed to step 630, where DBT processing corresponding to the UPDATE manipulation is performed on the DBT corresponding to the object as a target of the manipulation read in step 615. The process then proceeds to step 640. The DBT processing corresponding to the UPDATE manipulation will be described later in detail with reference to a flowchart in FIG. 8.

If it is determined in step 620 that the manipulation read in step 615 is the object deleting manipulation (DELETE), the process follows the arrow labeled "DELETE" to proceed to step 635, where DBT processing corresponding to the DELETE manipulation is performed on the DBT corresponding to the object as a target of the manipulation read in step 615. The process then proceeds to step 640. The DBT processing corresponding to the DELETE manipulation will be described later in detail with reference to a flowchart in FIG. 9.

In step 640, it is determined whether the entries in the DBT corresponding to the object as the target of the manipulation read in step 615 are all filled. If it is determined in step 640 that one or more entries in the DBT have not been filled, the process follows the NO arrow to proceed to step 650.

If it is determined in step 640 that the entries in the DBT are all filled, the process proceeds to step 645, where the DBT is used for modification of the graph data in the graph repository 275. The graph data modification processing will be described later in detail with reference to a flowchart in FIG. 10.

The process then proceeds to step 650, where it is determined whether the manipulation log includes a manipulation yet to be read. If it is determined in step 650 that there is a remaining manipulation, the process follows the YES arrow to return to step 615, and the similar processing is repeated for the next manipulation in the manipulation log. If it is determined in step 650 that there is no remaining manipulation, the process follows the NO arrow to proceed to step 655, where the process is terminated.

Figure 7:
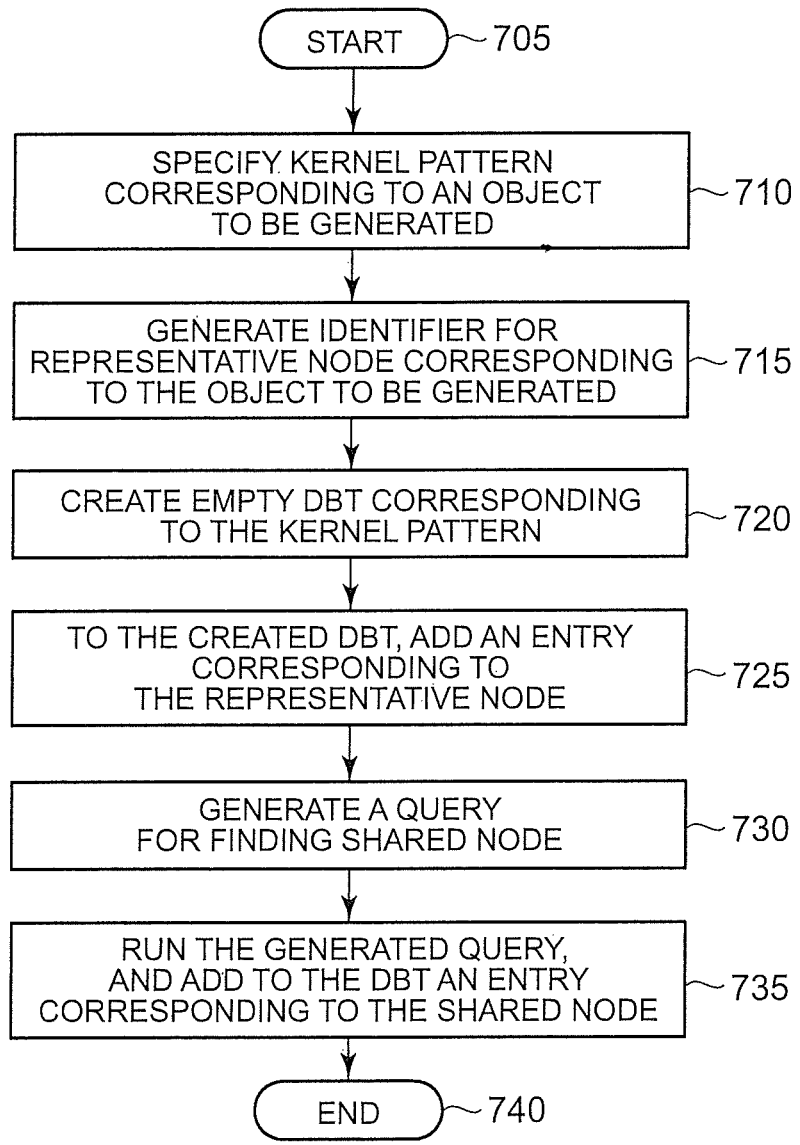
FIG. 7 is a flowchart illustrating an operation of DBT processing corresponding to object generating processing (CREATE) by the data processing system according to an embodiment of the present invention.

Next, with reference to a flowchart 625 in FIG. 7, an example of the DBT processing corresponding to the object generating manipulation (CREATE) in the object data, performed in step 625 in FIG. 6, will be described in more detail. FIG. 7 shows the flowchart illustrating an operation of the DBT processing corresponding to the object generating manipulation (CREATE), performed by the data processing system of the embodiment of the present invention. The process starts at step 705. In step 710, a kernel pattern corresponding to the object as a target of the generating manipulation (CREATE) read in step 615 is specified.

Then, in step 715, an identifier for a node that matches the representative node in the kernel pattern corresponding to the target object is determined. Next, in step 720, a DBT corresponding to the kernel pattern is newly created. Then, in step 725, an entry indicating the representative node in the kernel pattern and a node in the graph data that matches the representative node (which is identified by the identifier generated in step 715) is added to the newly created DBT.

The process then proceeds to step 730, where a query in SPARQL for finding a shared node is generated from the kernel pattern. The shared node refers to a node in graph data that is related to a certain object and that can also be related to another object. That is, the shared node belongs to a portion in the graph data that cannot be converted to a data structure as an image of the homomorphism. In the embodiment of the present invention, a node that matches a pattern consisting only of a combination of general node variable, direct-designated node, and/or literal node may be the shared node.

It is assumed in the embodiment of the present invention that the graph repository 275 stores graph data according to the RDF format as a set of combinations each including two nodes and an edge connecting the nodes. Thus, a query for finding a shared node may be generated such that it extracts, from within the kernel pattern, (1) a combination of two general node variables and an edge connecting them, (2) a combination of a general node variable, a direct-designated node, and an edge connecting them, (3) a combination of a general node variable, a literal node, and an edge connecting them, (4) a combination of two direct-designated nodes and an edge connecting them, and (5) a combination of a direct-designated node, a literal node, and an edge connecting them, and finds any node satisfying these conditions.

Thereafter, in step 735, the query generated in step 730 is transmitted to the graph repository 275, and on the basis of the returned information about the shared node, an entry corresponding to the shared node is added to the DBT generated in step 720. The process then proceeds to step 740, where the process is terminated. At this point in time, the DBT has been formed in which entries for only the representative node and the shared node (if any) are filled, while entries for the remaining nodes are empty.

Figure 8:
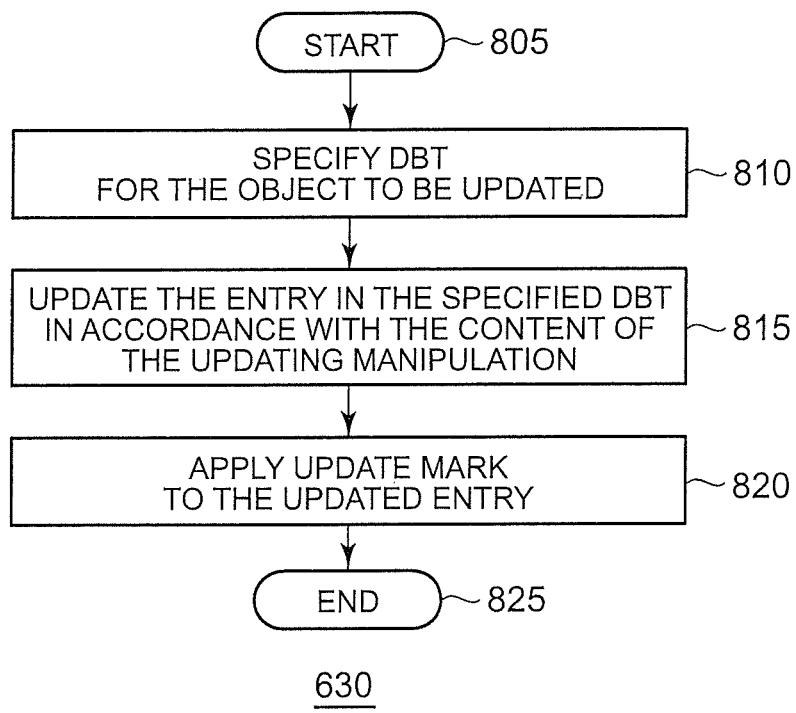
FIG. 8 is a flowchart illustrating an operation of DBT processing corresponding to object updating processing (UPDATE) by the data processing system according to an embodiment of the present invention.

With reference to a flowchart 630 in FIG. 8, an example of the DBT processing corresponding to the object updating manipulation (UPDATE) in the object data, performed in step 630 in FIG. 6, will be described in more detail. FIG. 8 shows the flowchart illustrating an operation of the DBT processing corresponding to the object updating manipulation (UPDATE), performed by the data processing system of the embodiment of the present invention. The process starts at step 805. In step 810, the DBT corresponding to the object as a target of the updating manipulation (UPDATE) read in step 615 is specified.

Then, in step 815, in accordance with the content of the updating manipulation (UPDATE) read in step 615, the entry in the DBT specified in step 810 is updated. The process proceeds to step 820, where an update mark is applied to the entry updated in step 815, and the process is terminated in step 825.

Figure 9:
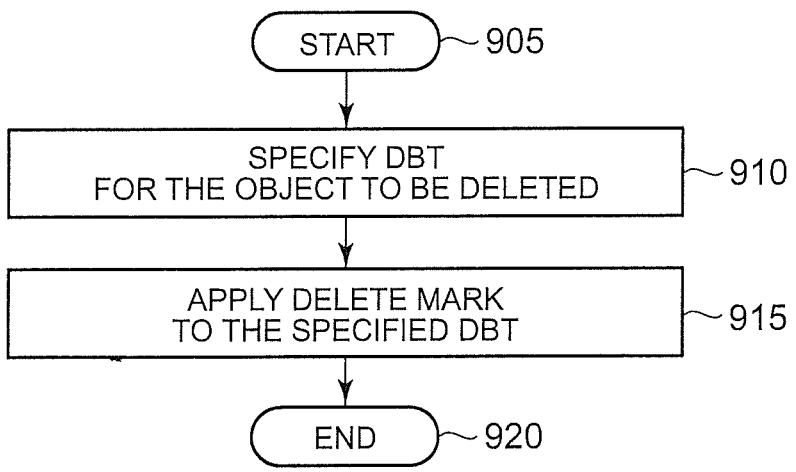
FIG. 9 is a flowchart illustrating an operation of DBT processing corresponding to object deleting processing (DELETE) by the data processing system according to an embodiment of the present invention.

With reference to a flowchart 635 in FIG. 9, an example of the DBT processing corresponding to the object deleting manipulation (DELETE) in the object data, performed in step 635 in FIG. 6, will be described in more detail. FIG. 9 shows the flowchart illustrating an operation of the DBT processing corresponding to the object deleting manipulation (DELETE), performed by the data processing system of the embodiment of the present invention. The process starts at step 905. In step 910, the DBT corresponding to the object as a target of the deleting manipulation (DELETE) read in step 615 is specified. Next, in step 915, a delete mark is applied to the DBT specified in step 910, and the process is terminated in step 920.

Figure 10:
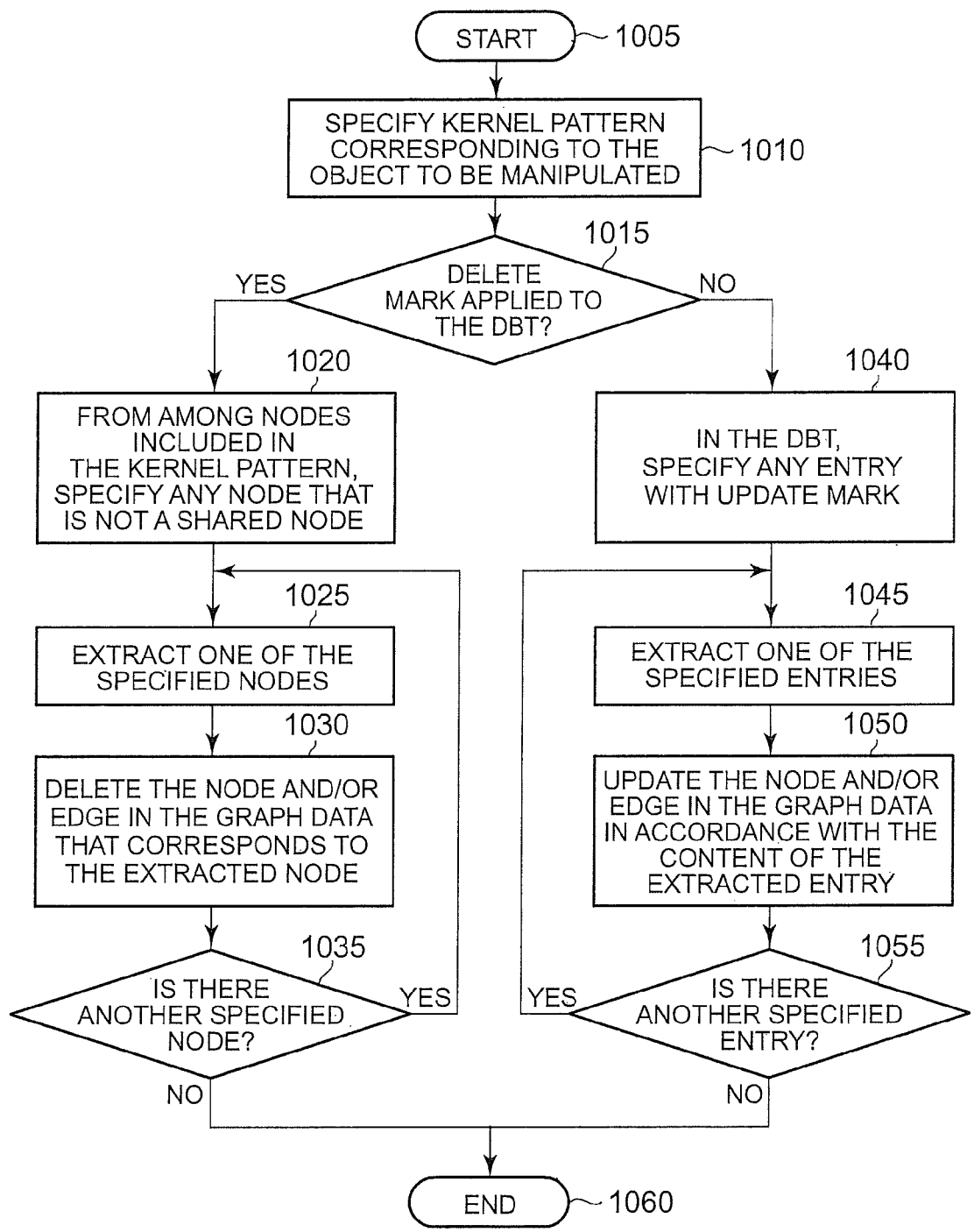
FIG. 10 is a flowchart illustrating an operation of graph data modification processing by the data processing system according to an embodiment of the present invention.

Next, with reference to a flowchart 645 in FIG. 10, an example of the processing of modifying the graph data in the graph repository on the basis of the DBT, performed in step 645 in FIG. 6, will be described in more detail. FIG. 10 shows the flowchart illustrating an operation of the graph data modification processing by the data processing system of the embodiment of the present invention. The process starts at step 1005. In step 1010, a kernel pattern corresponding to the object as a target of the manipulation read in step 615 is specified.

The process proceeds to step 1015, where it is determined whether a delete mark has been applied to the DBT corresponding to the object as a target of the manipulation read in step 615. If it is determined in step 1015 that a delete mark has been applied to the DBT, the process follows the YES arrow to proceed to step 1020.

In step 1020, the kernel pattern specified in step 1010 is used to specify any node that is not a shared node, from among the nodes in the graph data that are included in the object as the target of manipulation. More specifically, a query for finding a shared node, as described above in conjunction with step 730, may be generated and transmitted to the graph repository 275 to specify the shared node, and the specified shared node may be excluded from the nodes in the graph data that are included in the object as the target of manipulation.

Then, in step 1025, one node is extracted from a set of the non-shared nodes specified in step 1020. The process then proceeds to step 1030. In step 1030, any node and/or edge in the graph data that is associated with the node extracted in step 1025 is deleted by running a query on the graph repository. In step 1035, it is determined whether there still remains another node specified in step 1020. If so, the process follows the YES arrow to return to step 1025, to, repeat the similar processing. If it is determined that there remains no node, the process follows the NO arrow to proceed to step 1060, where the process is terminated.

If it is determined in step 1015 that the delete mark is not applied to the DBT, the process follows the NO arrow to proceed to step 1040. In step 1040, any entry having the update mark applied thereto in the DBT corresponding to the object as the target of the manipulation read in step 615 is specified.

Next, in step 1045, one entry is extracted from a set of the entries having the update mark applied thereto specified in step 1040. The process then proceeds to step 1050. In step 1050, in accordance with the content of the entry extracted in step 1045, the node and/or edge in the graph data in the graph repository is updated. In step 1055, it is determined whether there still remains another entry specified in step 1040. If so, the process follows the YES arrow to return to step 1045, to repeat the similar processing. If it is determined that there remains no entry, the process follows the NO arrow to proceed to step 1060, where the process is terminated.

The object data manipulating processing and the processing of reflecting the result in the graph data in the graph repository have been described above. The object manipulation and the accompanying DBT processing will be described below by giving two examples.

Figure 19:
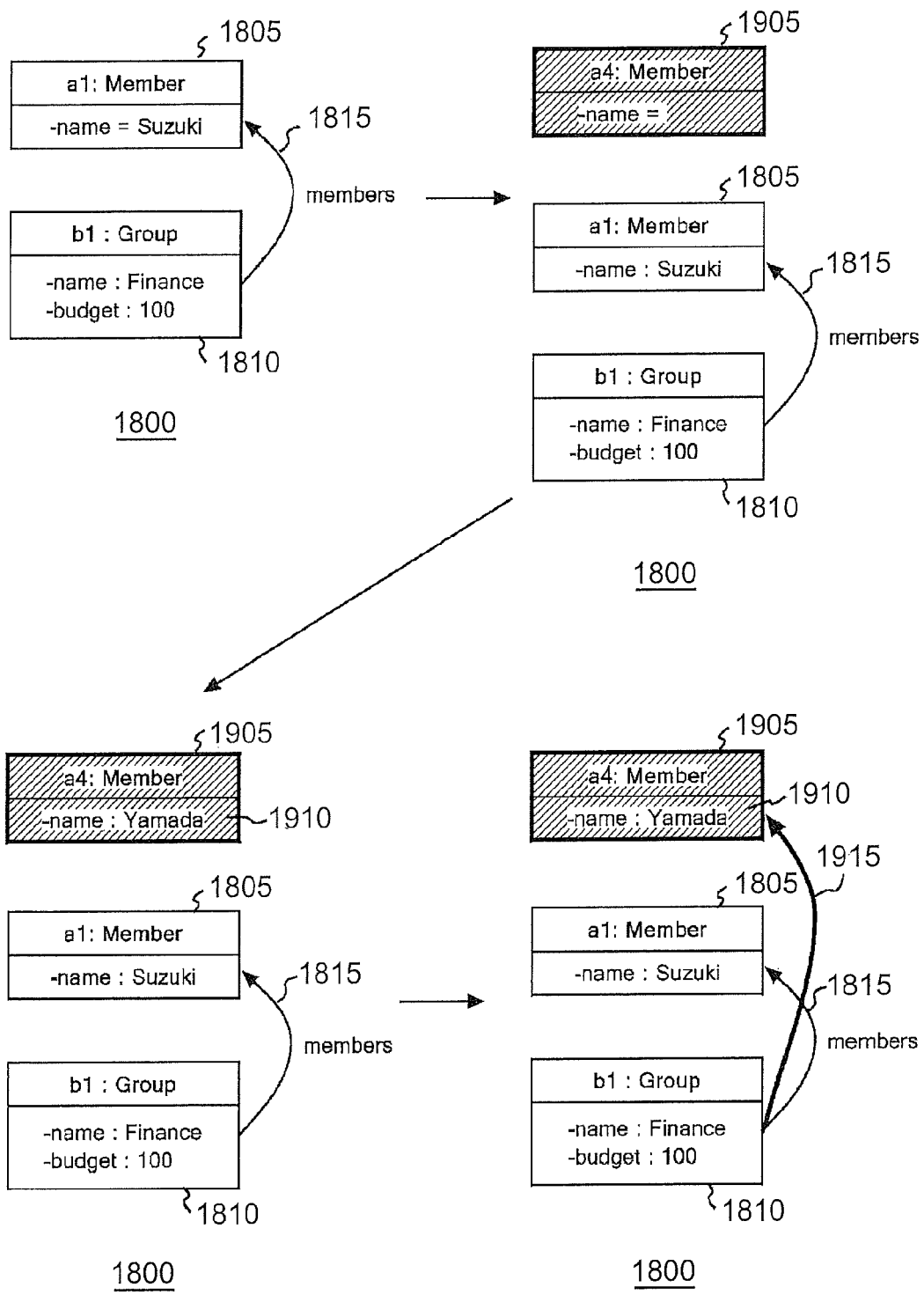
FIG. 19 shows a first example of the flow of the object manipulation according to an embodiment of the present invention.

FIG. 19 shows a first example of the flow of the object manipulation. In the first example, in the object data shown in FIG. 18, a new object 1905 ("Member") is generated (CREATE); then, an attribute value "Yamada" is input to the generated object 1905 (UPDATE); and then, a relation 1915 is added between the object 1810 and the object 1905 (UPDATE).

FIG. 20 shows manipulation logs for the first example of the flow of the object manipulation. The above-described object generating manipulation, attribute value inputting manipulation, and relation adding manipulation are logged as manipulation logs 2005, 2010, and 2015, respectively.

Figure 21:
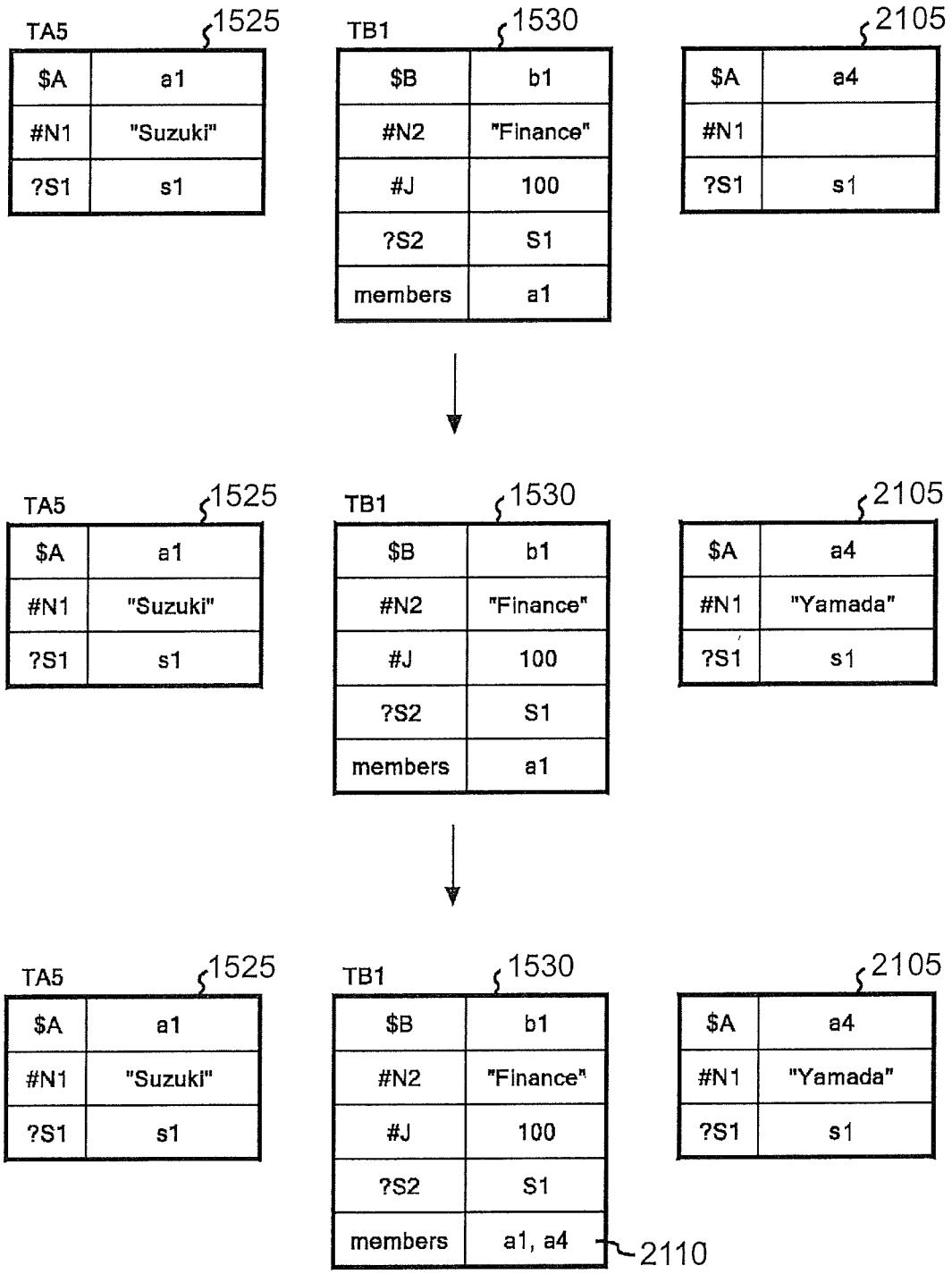
FIG. 21 shows changes of the DBTs in accordance with the first example of the flow of the object manipulation according to an embodiment of the present invention.

FIG. 21 shows DBTs that change in accordance with the first example of the flow of the object manipulation. First, the manipulation log 2005 corresponding to the generation of the object 1905 is read to perform the DBT processing. As a result, a DBT 2105 is generated that includes only the entries for the representative node variable ("$A") and the general node variable ("?S1"). Next, the manipulation log 2010 corresponding to the input of the attribute value "Yamada" is read to perform the DBT processing. As a result, the entry for the unique node "#N" in the DBT 2105 is updated. Then, on the basis of the DBT 2105 having all the entries filled, the graph data in the graph repository 275 is modified.

Figure 22:
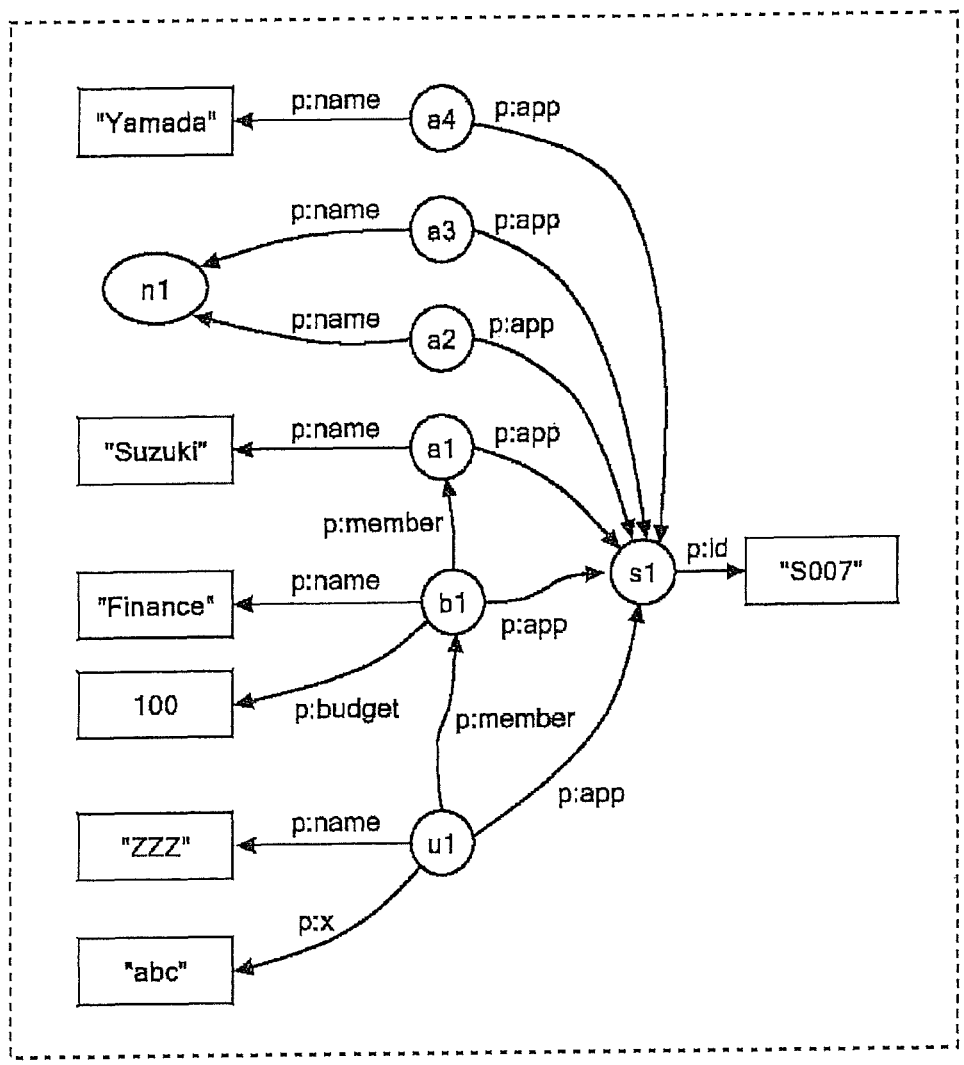
FIG. 22 shows graph data which reflects the first example of the flow of the object manipulation according to an embodiment of the present invention.

Next, the manipulation log 2015 corresponding to the addition of the relation 1915 is read to perform the DBT processing. As a result, information 2110 on the relation 1915 is added to the entry for the interlink "members" in the DBT 1530. Then, on the basis of the DBT 1530, the graph data in the graph repository 275 is modified. The graph data in the graph repository 275 as a result of the above modifications is shown in FIG. 22.

Figure 23:
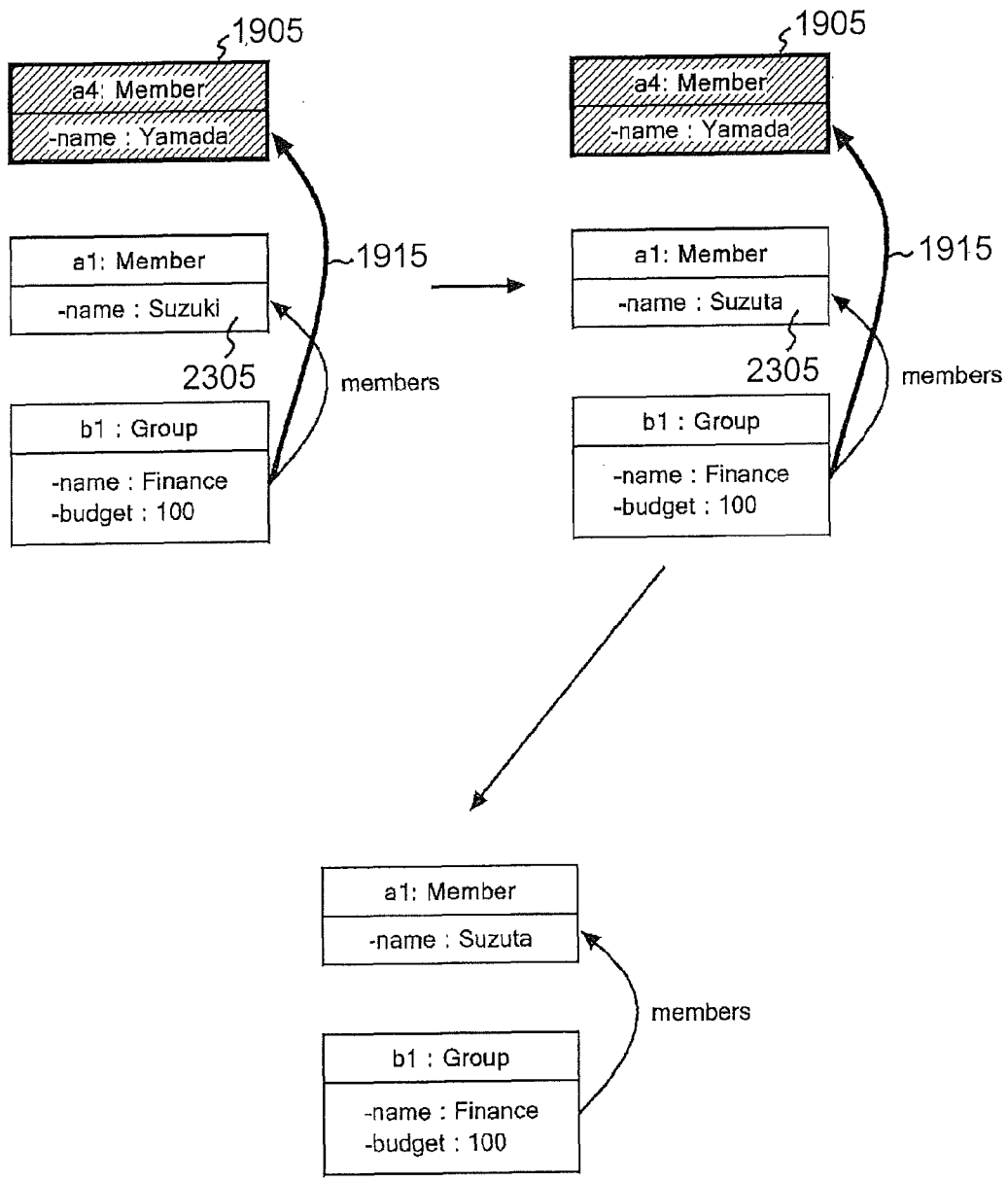
FIG. 23 shows a second example of the flow of the object manipulation according to an embodiment of the present invention.

FIG. 23 shows a second example of the flow of the object manipulation. In the second example, in the object data shown in FIG. 19 that has undergone the manipulations in the first example, the attribute value of the existing object 2305 is changed from "Suzuki" to "Suzuta" (UPDATE); then, the relation 1915 is deleted (UPDATE); and then, the object 1905 is deleted (DELETE).

Figure 24:
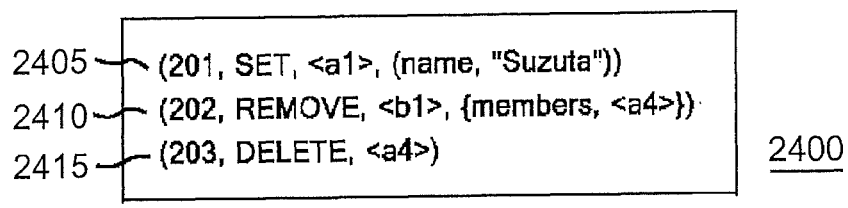
FIG. 24 shows manipulation logs for the second example of the flow of the object manipulation according to an embodiment of the present invention.

FIG. 24 shows manipulation logs for the second example of the flow of the object manipulation. The above-described object attribute value changing manipulation, relation deleting manipulation, and object deleting manipulation are logged as manipulation logs 2405, 2410, and 2415, respectively.

Figure 25:
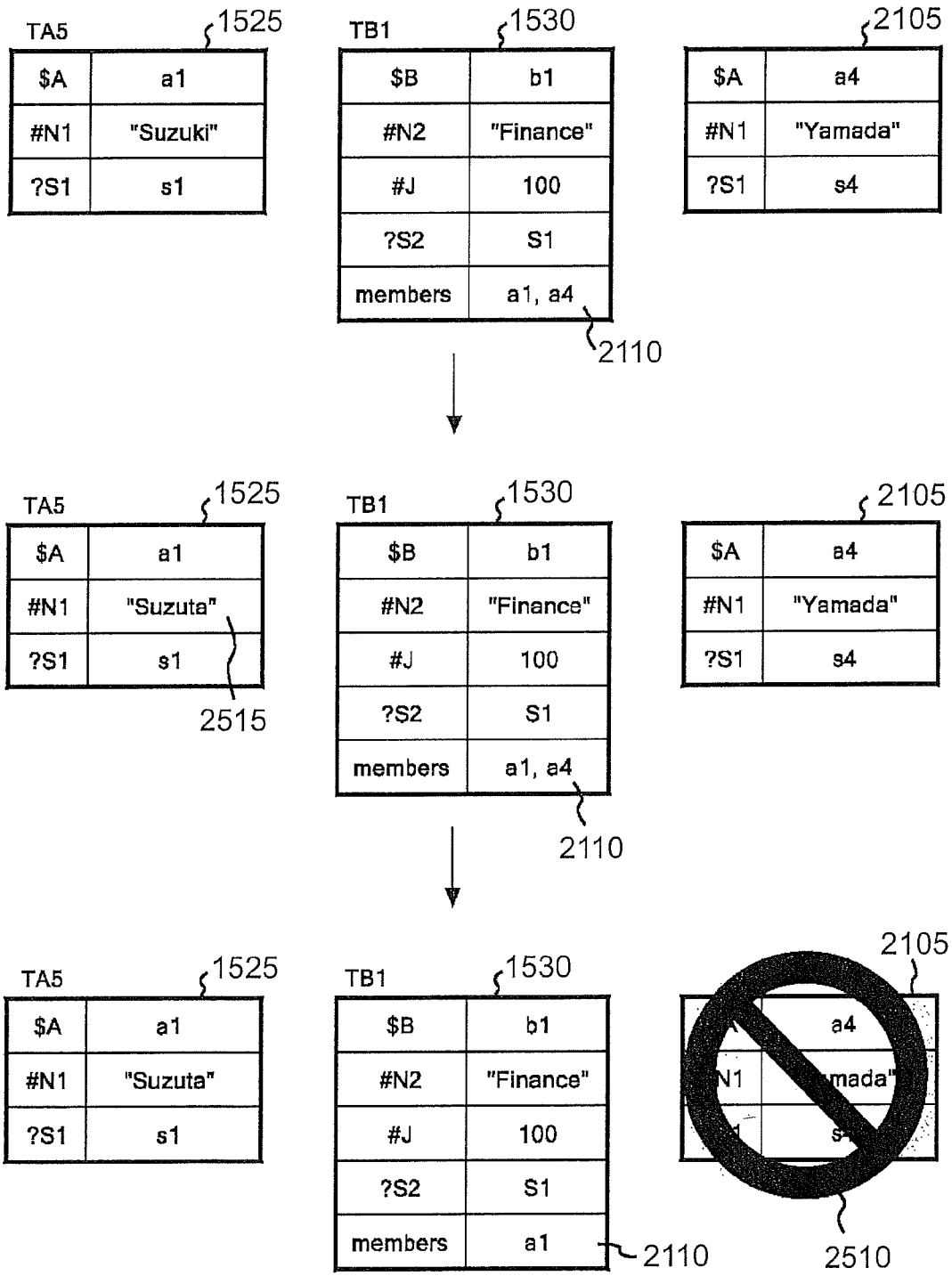
FIG. 25 shows changes of the DBTs in accordance with the second example of the flow of the object manipulation according to an embodiment of the present invention.

FIG. 25 shows DBTs that change in accordance with the second example of the flow of the object manipulation. First, the manipulation log 2405 corresponding to the change of the attribute value of the object 2305 is read to perform the DBT processing, so that the attribute value 2515 in the DBT 1525 is changed. Then, on the basis of the DBT 1525, the graph data in the graph repository 275 is modified.

Figure 26:
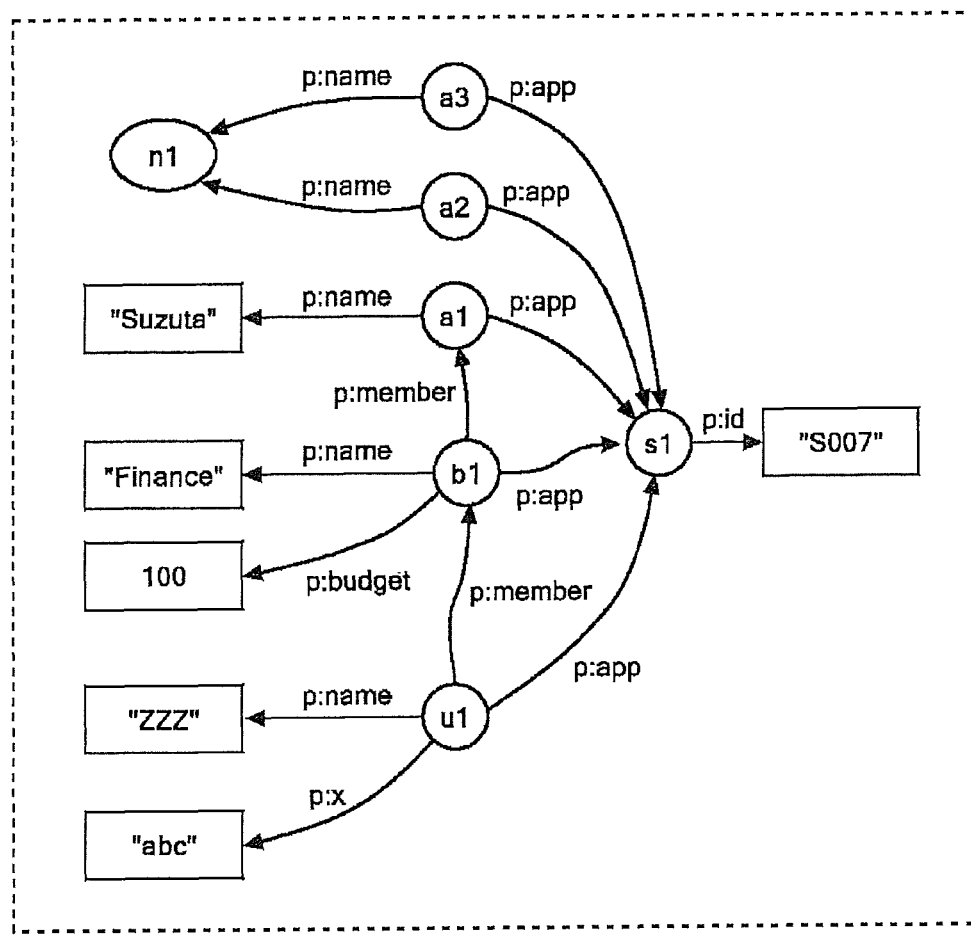
FIG. 26 shows graph data which reflects the second example of the flow of the object manipulation according to an embodiment of the present invention.

Next, the manipulation log 2410 corresponding to the deletion of the relation 1915 is read to perform the DBT processing, so that the information 2110 corresponding to the relation 1915 is deleted from the entry for the interlink "members" in the DBT 1530. Then, on the basis of the DBT 1530, the graph data in the graph repository 275 is modified. Further, the manipulation log 2415 corresponding to the deletion of the object 1905 is read to perform the DBT processing, so that the delete mark 2510 is applied to the DBT 2105. Then, on the basis of the DBT 2105 having the delete mark 2510 applied thereto, the graph data in the graph repository 275 is modified. The graph data in the graph repository 275 as a result of the above modifications is shown in FIG. 26.

Figure 27:
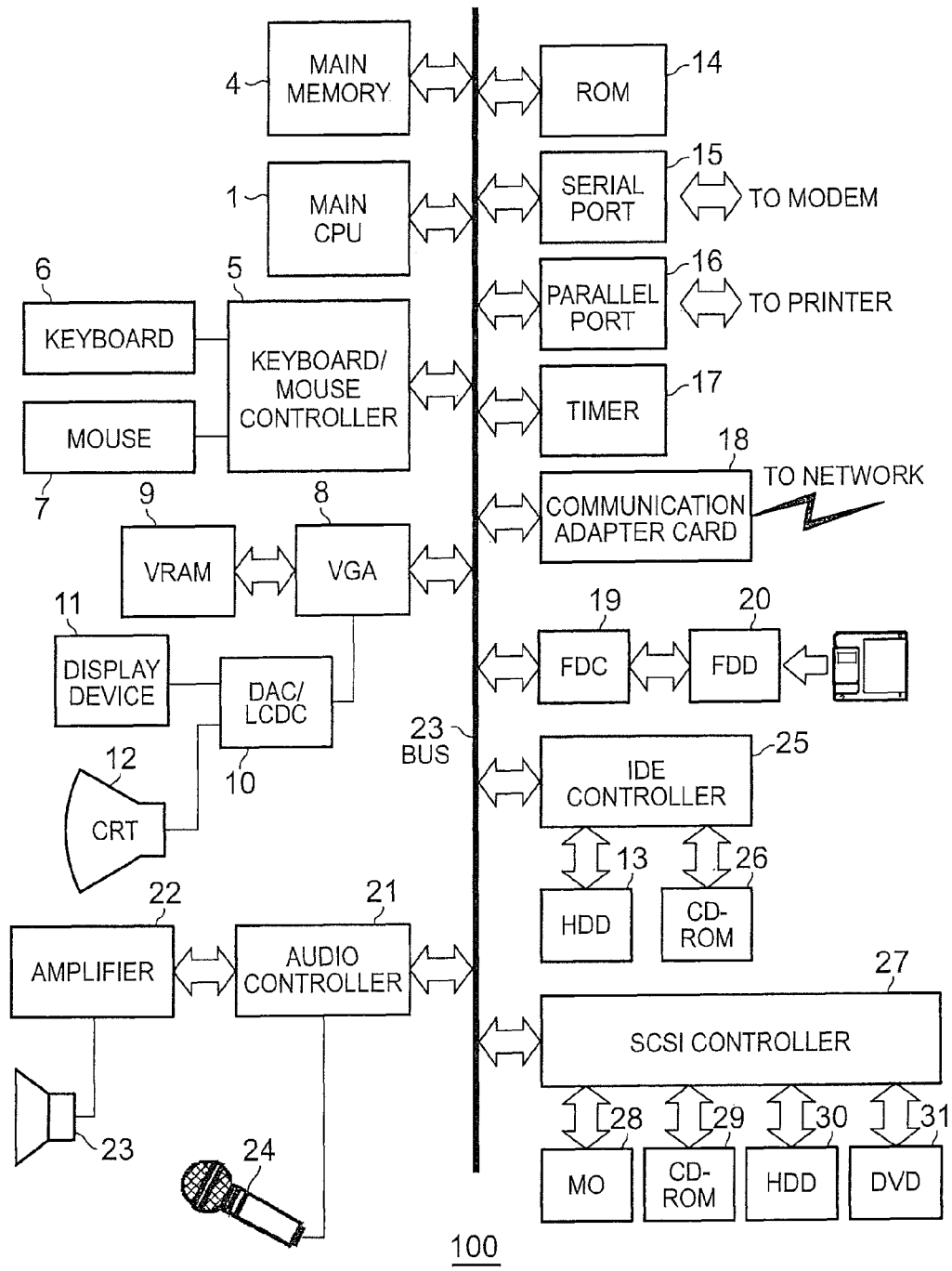
FIG. 27 shows, by way of example, the hardware configuration of an information processing device which is suitable for implementing the data processing system according to an embodiment of the present invention.

FIG. 27 shows, by way of example, the hardware configuration of an information processing device which is suitable for implementing the terminals 100 and 105 and the server 110 according to an embodiment of the present invention. The information processing device includes a central processing unit (CPU) 1 and a main memory 4 each connected to a bus 2.

Further, hard disk drives 13 and 30 and removable storages (external storage systems with removable recording media), such as CD-ROM drives 26 and 29, a flexible disk drive 20, an MO drive 28, and a DVD drive 31, are connected to the bus 2 via a flexible disk controller 19, an IDE controller 25, an SCSI controller 27, and so on.

Storage media such as a flexible disk, an MO, a CD-ROM, and a DVD-ROM are inserted into the removable storages. These storage media, the hard disk drives 13 and 30, and a ROM 14 may record codes of a computer program that cooperates with an operation system to provide the CPU and so on with instructions so as to implement embodiments of the present invention. The computer program is executed as it is loaded to the main memory 4. The computer program may be compressed or divided into a plurality of parts so as to be recorded on a plurality of media.

The information processing device receives an input from an input device such as a keyboard 6 or a mouse 7 via a keyboard/mouse controller 5. The information processing device is connected via a DAC/LCDC 10 to a display device 11 for providing a user with visual data.

The information processing device may be connected to a network via a network adapter 18 (Ethernet® card, token-ring card) or the like for communication with other computers. Although not shown in the figure, the information processing device may also be connected to a printer via a parallel port, or to a modem via a serial port.

It will readily be appreciated from the above description that the information processing device suitable for implementing the data processing system according to an embodiment of the present invention may be implemented by an information processing device such as a typical personal computer, work station, mainframe, or a combination thereof. The constituent elements, however, are only illustrative; not all the elements are indispensable for embodiments of the present invention.

Various modifications, including combining a plurality of machines so as to distribute thereto the functions of the hardware components of the information processing device used in embodiments of the present invention, will of course be readily conceivable for those skilled in the art. Such modifications are naturally within the scope of the present invention.

The data processing system of an embodiment of the present invention adopts an operating system that supports a graphical user interface (GUI) multi-window environment, such as the Windows® operating system provided by Microsoft Corporation, MacOS® provided by Apple Computer Incorporated, and a UNIX® like system equipped with the X Window System (for example, AIX® provided by International Business Machines Corporation).

From the above description, it can be understood that the data processing system used in the embodiment of the present invention is not restricted to any particular multi-window operating system environment.

As described above, according to an embodiment of the present invention, an efficient system, software, and method for converting graph data to a data structure that enables manipulations performed in various applications to be reflected in the original graph data are implemented. This can enhance the user productivity of operating an object handling system to manipulate the object data to thereby edit the graph data stored in a graph repository, as is readily understood.

Further, the embodiments of the present invention may be implemented as hardware, software, or a combination thereof. The combination of the hardware and software may be implemented typically in a data processing system having a predetermined program. In this case, the predetermined program may be loaded to the data processing system for execution, so that the program controls the data processing system to carry out the processing according to embodiments of the present invention. This program is composed of a set of instructions that can be expressed in arbitrary language, code, or description. Such a set of instructions enables the system to carry out the specific functions directly, or after execution of one or both of: (1) conversion to another language, code, or description; and (2) duplication to another medium.

Of course, not only such a program itself but also a medium recording the program are within the scope of the present invention. The program for executing the functions of embodiments of the present invention may be stored in any computer-readable recording medium such as a flexible disk, MO, CD-ROM, DVD, hard disk drive, ROM, MRAM, RAM, and so on. The program may be downloaded from another data processing system connected via a communication line for storage in a recording medium, or may be duplicated from another recording medium. Further, the program may be compressed or divided into a plurality of parts so as to be stored in one or more recording media. It should also be noted that a program product for implementing embodiments of the present invention may of course be provided in various manners.

It is apparent to those skilled in the art that various modifications or improvements are possible for the above-described embodiment. Such modified or improved embodiments, for example, are naturally within the technical scope of the present invention.

What is claimed is:

1. A device comprising:
   means for manipulating a given object, the given object comprising a mapping of at least a portion of graph data comprising one or more nodes and one or more edges connecting the one or more nodes as table data;
   means for accessing a graph repository storing the graph data;
   means for specifying, from among nodes in the graph data that are related to the given object, at least one shared node that is also related to one or more other objects; and
   means for reflecting the manipulation of the given object in the graph data while preserving relationships of the specified shared node with the one or more other objects;
   wherein the mapping of the given object is defined by at least one graph matching pattern, each graph matching pattern comprising a plurality of different node variables including a representative node variable and a unique node variable, the representative node variable being subject to a first constraint condition and the unique node variable being subject to a second constraint condition;
   wherein the first constraint condition specifies that there is at most one node in the graph data that matches a representative node variable for a given one of the graph matching patterns, the at most one node matching the representative node variable for the given graph matching pattern not matching one or more other node variables in another graph matching pattern unless the other graph matching pattern has an inheritance relationship with the given graph matching pattern;
   wherein the second constraint condition specifies that a node matching a unique node variable in the graph data for the given graph matching pattern uniquely corresponds to the representative node variable in the given graph matching pattern; and
   wherein object data corresponding to the given object comprises a first portion matching the representative node variable and the unique node variable that is a homomorphism of the graph data and a second portion including the specified shared node that is not a homomorphism of the graph data.

2. The device of claim 1, further comprising means for providing the at least one graph matching pattern corresponding to the given object.

3. The device of claim 2, wherein the given object comprises one or more tables and the means for reflecting the manipulation includes means for reflecting the manipulation in the graph data by using a given table comprising an entry of correspondence between a node variable included in the graph matching pattern and a node in the graph data that matches the node variable.

4. The device of claim 3, wherein:
the manipulation is updating of the given object; and
the device further comprises means for:
specifying a table corresponding to the given object; and
reflecting in the graph data the object updating performed on the given object in the specified table.

5. The device of claim 3, wherein:
the manipulation is deletion of the given object and
the device further comprises means for:
specifying a table corresponding to the given object; and on the basis of information other than information on the shared node included in the specified table, reflecting the manipulation in the graph data while preventing the specified shared node from being deleted.

6. The device of claim 1, further comprising means for:
specifying the at least one graph matching pattern corresponding to the given object; and
generating a query for specifying the at least one shared node based at least in part on the specified graph matching pattern.

7. The device of claim 1, wherein:
the manipulation is generation of the given object; and
the means for reflecting the manipulation comprises means for reflecting the manipulation in the graph data by forming a link from the given object to the specified shared node in the graph data without generating a new node.

8. The device of claim 1, wherein:
the manipulation is generation of the given object; and
the device further comprises means for creating a new table corresponding to the given object.

9. The device of claim 8, further comprising means for adding to the new table an entry corresponding to the specified shared node.

10. The device of claim 8, further comprising means for adding to the new table an entry corresponding to a representative node variable included in the at least one graph matching pattern.

11. The device of claim 8, further comprising means for adding an entry corresponding to a node other than a representative node and a shared node included in the at least one graph matching pattern, wherein the manipulation is reflected in the graph data on the condition that all entries included in the table are filled.

12. The device of claim 1, wherein:
the manipulation is deletion of the given object; and
the means for reflecting the manipulation comprises means for reflecting the manipulation in the graph data while preventing the specified shared node from being deleted.

13. The device of claim 1, wherein the manipulation comprises creating a manipulation log comprising one or more actions, the one or more actions comprise one or more of create, update and delete operations for attributes of one or more nodes and edges in the graph data.

14. The device of claim 13, wherein:
object data corresponding to the given object comprises a set of one or more tables;
manipulating the object data comprises marking one or more entries in at least one of the one or more tables based on the one or more actions in the manipulation log; and
reflecting the manipulation of the given object in the graph data comprises modifying the graph data in accordance with the marked entries in the at least one table.

15. The device of claim 1, wherein the plurality of different node variables further include a direct-designated node variable matching nodes in the graph data that is directly designate by its identifier, a literal node variable matching nodes in the graph data that are each connected to a single node via an edge, and a general node variable matching nodes without constraints; and
wherein the specified shared node comprises a node returned by the at least one graph matching pattern that matches at least one of the direct-designated node variable, the literal node variable and the general node variable.

16. An apparatus comprising:
a memory; and
a processor device operatively coupled to the memory and configured to:
manipulate a given object, the given object comprising a mapping of at least a portion of graph data comprising one or more nodes and one or more edges connecting the one or more nodes as table data;
access a graph repository storing the graph data;
specify, from among nodes in the graph data that are related to the given object, at least one shared node that is also related to one or more other objects; and
reflect the manipulation of the given object in the graph data while preserving relationships of the specified shared node with the one or more other objects;
wherein the mapping of the given object is defined by at least one graph matching pattern, each graph matching pattern comprising a plurality of different node variables including a representative node variable and a unique node variable, the representative node variable being subject to a first constraint condition and the unique node variable being subject to a second constraint condition;
wherein the first constraint condition specifies that there is at most one node in the graph data that matches a representative node variable for a given one of the graph matching patterns, the at most one node matching the representative node variable for the given graph matching pattern not matching one or more other node variables in another graph matching pattern unless the other graph matching pattern has an inheritance relationship with the given graph matching pattern;
wherein the second constraint condition specifies that a node matching a unique node variable in the graph data for matching pattern uniquely corresponds to the representative node variable in the given graph matching pattern; and
wherein object data corresponding to the given object comprises a first portion matching the representative node variable and the unique node variable that is a homomorphism of the graph data and a second portion including the specified shared node that is not a homomorphism of the graph data.

17. The apparatus of claim 16, wherein the plurality of different node variables further include a direct-designated node variable matching nodes in the graph data that is directly designate by its identifier, a literal node variable matching nodes in the graph data that are each connected to a single node via an edge, and a general node variable matching nodes without constraints; and wherein the specified shared node comprises a node returned by the at least one graph matching pattern that matches at least one of the direct-designated node variable, the literal node variable and the general node variable.

18. A method comprising the steps of:

manipulating a given object, the given object comprising a mapping of at least a portion of graph data comprising one or more nodes and one or more edges connecting the one or more nodes as table data;

specifying, from among nodes in the graph data that are related to the given object, at least one shared node that is also related to one or more other objects; and reflecting the manipulation of the given object in the graph data while preserving relationships of the specified shared node with the one or more other objects;

wherein the mapping of the given object is defined by at least one graph matching pattern, each graph matching pattern comprising a plurality of different node variables including a representative node variable and a unique node variable, the representative node variable being subject to a first constraint condition and the unique node variable being subject to a second constraint condition;

wherein the first constraint condition specifies that there is at most one node in the graph data that matches a representative node variable for a given one of the graph matching patterns, the at most one node matching the representative node variable for the given graph matching pattern not matching one or more other node variables in another graph matching pattern unless the other graph matching pattern has an inheritance relationship with the given graph matching pattern;

wherein the second constraint condition specifies that a node matching a unique node variable in the graph data for the given graph matching pattern uniquely corresponds to the representative node variable in the given graph matching pattern; and wherein object data corresponding to the given object comprises a first portion matching the representative node variable and the unique node variable that is a homomorphism of the graph data and a second portion including the specified shared node that is not a homomorphism of the graph data.

19. The method of claim 18, wherein the plurality of different node variables further include a direct-designated node variable matching nodes in the graph data that is directly designate by its identifier, a literal node variable matching nodes in the graph data that are each connected to a single node via an edge, and a general node variable matching nodes without constraints; and wherein the specified shared node comprises a node returned by the at least one graph matching pattern that matches at least one of the direct-designated node variable, the literal node variable and the general node variable.

20. An article of manufacture comprising a non-transitory computer readable storage medium for storing computer readable program code which, when executed causes a computer to perform the steps of:

manipulating a given object, the object comprising a mapping of at least a portion of graph data comprising one or more nodes and one or more edges connecting the one or more nodes as table data;

specifying, from among nodes in the graph data that are related to the given object, at least one shared node that is also related to one or more other objects; and reflecting the manipulation of the given object in the graph data while preserving relationships of the specified shared node with the one or more other objects;

wherein the mapping of the given object is defined by at least one graph matching pattern, each graph matching pattern comprising a plurality of different node variables including a representative node variable and a unique node variable, the representative node variable being subject to a first constraint condition and the unique node variable being subject to a second constraint condition;

wherein the first constraint condition specifies that there is at most one node in the graph data that matches a representative node variable for a given one of the graph matching patterns, the at most one node matching the representative node variable for the given graph matching pattern not matching one or more other node variables in another graph matching pattern unless the other graph matching pattern has an inheritance relationship with the given graph matching pattern;

wherein the second constraint condition specifies that a node matching a unique node variable in the graph data for the given graph matching pattern uniquely corresponds to the representative node variable in the given graph matching pattern; and wherein the object data corresponding to the given object comprises a first portion matching the representative node variable and the unique node variable that is a homomorphism of the graph data and a second portion including the specified shared node that is not a homomorphism of the graph data.

\* \* \* \* \*